(12) United States Patent
Kubota

(10) Patent No.: US 12,455,434 B2
(45) Date of Patent: Oct. 28, 2025

(54) IMAGE PICKUP LENS

(71) Applicant: Tokyo Visionary Optics Co., Ltd., Tokyo (JP)

(72) Inventor: Kenichi Kubota, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 617 days.

(21) Appl. No.: 17/646,099

(22) Filed: Dec. 27, 2021

(65) Prior Publication Data
US 2022/0342181 A1    Oct. 27, 2022

(30) Foreign Application Priority Data
Dec. 25, 2020   (JP) .................... 2020-216120

(51) Int. Cl.
*G02B 13/00*    (2006.01)
*G02B 9/64*     (2006.01)

(52) U.S. Cl.
CPC ........... *G02B 9/64* (2013.01); *G02B 13/0045* (2013.01)

(58) Field of Classification Search
CPC .. G02B 9/64; G02B 13/0045; G02B 13/0015; G02B 13/06; G03B 30/00
See application file for complete search history.

(56) References Cited

U.S. PATENT DOCUMENTS

| | | | |
|---|---|---|---|
| 11,662,555 B2 * | 5/2023 | Ye | G02B 9/64 |
| | | | 359/754 |
| 2019/0310448 A1 * | 10/2019 | Hashimoto | G02B 13/0045 |
| 2020/0174227 A1 * | 6/2020 | Nitta | G02B 9/64 |

FOREIGN PATENT DOCUMENTS

CN         111007631 A         4/2020

* cited by examiner

*Primary Examiner* — Mustak Choudhury
(74) *Attorney, Agent, or Firm* — Maine Cernota & Curran

(57) ABSTRACT

An imaging lens includes: arranged in order from an object side to an image side IM, a first lens L1 having positive refractive power; a second lens L2 having negative refractive power; a third lens L3 having positive refractive power; a fourth lens L4 having negative refractive power; a fifth lens L5; a sixth lens L6 having negative refractive power; a seventh lens L7 having negative refractive power; and an eighth lens L8 having negative refractive power. The second lens L2 has a convex object-side surface in a paraxial region, and the sixth lens L6 has a concave object-side surface in a paraxial region.

6 Claims, 12 Drawing Sheets

IMAGE PICKUP LENS

BACKGROUND OF THE INVENTION AND RELATED ART STATEMENT

The present invention relates to an imaging lens for forming an image of an object on an image sensor, such as a CCD sensor and a CMOS sensor.

With the development of IoT (Internet of Things) technology, portable information devices, such as smartphones and cellular phones, as well as many products and devices, such as video game consoles, home appliances, and automobiles, are connected to networks, and various types of information are shared between these "Things". In the IoT environment, various services are allowed to be provided using image information from cameras built in the "Things". The image information transmitted through networks continuously increases every year and such a camera is expected to be miniaturized and also to have high resolving power.

To obtain a high-resolution distinctive image, aberrations in an imaging lens built in the camera have to be satisfactorily corrected. A lens configuration including eight lenses has, due to the large number of lenses composing the imaging lens, a high degree of freedom in design and thus allows satisfactory correction of aberrations. Patent Document 1 discloses an imaging lens having such an eight-lens configuration.

The imaging lens described in Patent Document 1 includes: a first lens having positive refractive power; a second lens having negative refractive power; a third lens having positive refractive power; a fourth lens; a fifth lens; a sixth lens; a seventh lens; and an eighth lens having negative refractive power. In the imaging lens, the refractive power of the first lens is less than the refractive power of the entire optical system of the imaging lens in a certain range and the third lens has a shape limited to a specific shape defined by a radius of curvature. In addition, the second lens has a thickness in a certain range relative to the distance between the second lens and the third lens to achieve satisfactory correction of aberrations.

Patent Document 1: Chinese Patent Application Publication No. 111007631

The above imaging lens described in Patent Document 1 allows relatively satisfactory correction of aberrations while providing a wide field of view. However, the resolution expected from the imaging lens increases every year, and considering adaptation of high resolution, the lens configuration described in Patent Document 1 causes insufficient correction of aberrations.

It is an object of the present invention to provide an imaging lens capable of satisfactorily correcting aberrations while achieving reduction in the profile of the imaging lens.

SUMMARY OF THE INVENTION

An imaging lens according to the present invention for forming an image of an object on an image sensor includes: in order from an object side to an image side, a first lens having positive refractive power; a second lens having negative refractive power; a third lens having positive refractive power; a fourth lens having negative refractive power; a fifth lens; a sixth lens having negative refractive power; a seventh lens having negative refractive power; and an eighth lens having negative refractive power.

In the imaging lens according to the present invention, the second lens having negative refractive power is arranged on the image plane side of the first lens having positive refractive power. This allows satisfactory correction of chromatic aberration while preferably reducing the profile of the imaging lens. In addition, since the third lens has positive refractive power, the first through third lenses are arranged in order with positive, negative, and positive refractive power, and it is thus possible to satisfactorily correct chromatic aberrations in a wide range of wavelengths. Moreover, the fourth lens having negative refractive power is arranged on the image plane side of the third lens to arrange the third lens and the fourth lens in order with positive and negative refractive power, and it is thus possible to precisely correct chromatic aberrations strongly desired for such an imaging lens with higher resolution. It should be noted that a low profile herein refers to a small ratio (total track length/diagonal length=total track/diagonal ratio) of the total track length, that is, the distance along the optical axis between the object-side surface of the first lens and the image plane to the diagonal length of the image plane of the image sensor.

In the imaging lens according to the present invention, three lenses of the sixth lens, the seventh lens, and the eighth lens have negative refractive power. It is thus possible that these lenses respectively have relatively less negative refractive power to satisfactorily correct aberrations.

It is preferable that, in the imaging lens in the above configuration, the second lens has a convex object-side surface in a paraxial region, and the sixth lens has a concave object-side surface in a paraxial region. The second lens and the sixth lens formed in such a shape allow the imaging lens to have a wider field of view while reducing the profile of the imaging lens.

It is preferable that, in the imaging lens in the above configuration, the eighth lens has an aspheric image-side surface having an inflection point. The eighth lens with the image-side surface formed in an aspheric shape having an inflection point allows satisfactory correction of field curvature and distortion at an image periphery while securing a back focus. The shape of the eighth lens also allows satisfactory correction of the aberrations in the paraxial and peripheral regions while controlling an incident angle of a ray of light emitted from the imaging lens on the image plane of the image sensor to be within the range of chief ray angle (CRA).

It is preferable that, in the imaging lens in the above configuration, the eighth lens has an image-side surface with a concave surface directed toward an image plane side in a paraxial region. The eighth lens formed in such a shape allows preferable achievement of reduction in the profile of the imaging lens.

It is preferable that, in the imaging lens in the above configuration, the eighth lens further has an object-side surface with a convex surface formed in the paraxial region. The eighth lens formed in a shape of a meniscus lens with the convex surface directed toward the object side in the paraxial region allows even more preferable achievement of reduction in the profile of the imaging lens.

It should be noted that a "lens" in the present invention refers to an optical element having refractive power. Accordingly, the term "lens" used herein does not include optical elements such as a prism to change a direction of light travel and a flat filter. These optical elements may be arranged in front of or behind the imaging lens or between respective lenses, as necessary.

It is preferable that the imaging lens in the above configuration satisfies a conditional expression (1) below:

$$-3.0 < f2/f3 < -0.2 \qquad (1)$$

where
f2: a focal length of the second lens, and
f3: a focal length of the third lens.

Satisfaction of the conditional expression (1) allows balanced and satisfactory correction of astigmatism, distortion, spherical aberration and, chromatic aberration of magnification in preferred ranges while reducing the profile of the imaging lens.

It is preferable that the imaging lens in the above configuration satisfies a conditional expression (2) below:

$$1.0 < f3/f < 7.0 \quad (2)$$

where
f: a focal length of entire optical system of the imaging lens, and
f3: a focal length of the third lens.

Satisfaction of the conditional expression (2) allows satisfactory correction of astigmatism, field curvature, and coma aberration while reducing the profile of the imaging lens.

It is preferable that the imaging lens in the above configuration satisfies a conditional expression (3) below:

$$-30.0 < f4/f3 < -1.0 \quad (3)$$

where
f3: a focal length of the third lens, and
f4: a focal length of the fourth lens.

Satisfaction of the conditional expression (3) allows balanced and satisfactory correction of field curvature, distortion, coma aberration, and chromatic aberration of magnification.

It is preferable that the imaging lens in the above configuration satisfies a conditional expression (4) below:

$$1.0 < f34/f < 6.0 \quad (4)$$

where
f: a focal length of entire optical system of the imaging lens, and
f34: a composite focal length of the third lens and the fourth lens.

Satisfaction of the conditional expression (4) allows balanced and satisfactory correction of astigmatism, field curvature, and distortion in preferred ranges.

It is preferable that the imaging lens in the above configuration satisfies a conditional expression (5) below:

$$-8.0 < f6/f < -1.5 \quad (5)$$

where
f: a focal length of entire optical system of the imaging lens, and
f6: a focal length of the sixth lens.

Satisfaction of the conditional expression (5) allows satisfactory correction of field curvature and distortion while reducing the profile of the imaging lens.

It is preferable that the imaging lens in the above configuration satisfies a conditional expression (6) below:

$$-8.0 < f56/f < -1.5 \quad (6)$$

where
f: a focal length of entire optical system of the imaging lens, and
f56: a composite focal length of the fifth lens and the sixth lens.

Satisfaction of the conditional expression (6) allows satisfactory correction of distortion and coma aberration while reducing the profile of the imaging lens.

It is preferable that the imaging lens in the above configuration satisfies a conditional expression (7) below:

$$0.2 < f7/f8 < 8.5 \quad (7)$$

where
f7: a focal length of the seventh lens, and
f8: a focal length of the eighth lens.

Satisfaction of the conditional expression (7) allows satisfactory correction of field curvature and astigmatism.

It is preferable that the imaging lens in the above configuration satisfies a conditional expression (8) below:

$$-10.0 < f78/f < -2.5 \quad (8)$$

where
f: a focal length of entire optical system of the imaging lens, and
f78: a composite focal length of the seventh lens and the eighth lens.

Satisfaction of the conditional expression (8) allows satisfactory correction of astigmatism and distortion while reducing the profile of the imaging lens.

It is preferable that the imaging lens in the above configuration satisfies a conditional expression (9) below:

$$0.2 < f56/f78 < 6.0 \quad (9)$$

where
f56: a composite focal length of the fifth lens and the sixth lens, and
f78: a composite focal length of the seventh lens and the eighth lens.

Satisfaction of the conditional expression (9) allows satisfactory correction of chromatic aberration of magnification.

It is preferable that the imaging lens in the above configuration satisfies a conditional expression (10) below:

$$0.2 < R2r/R3f < 1.0 \quad (10)$$

where
R2r: a paraxial radius of curvature of an image-side surface of the second lens, and
R3f: a paraxial radius of curvature of an object-side surface of the third lens.

Satisfaction of the conditional expression (10) allows balanced and satisfactory correction of astigmatism, spherical aberration, and chromatic aberration of magnification.

It is preferable that the imaging lens in the above configuration satisfies a conditional expression (11) below:

$$-4.0 < R6f/f < -0.3 \quad (11)$$

where
f: a focal length of entire optical system of the imaging lens, and
R6f: a paraxial radius of curvature of an object-side surface of the sixth lens.

Satisfaction of the conditional expression (11) allows balanced and satisfactory correction of astigmatism, field curvature, and chromatic aberration of magnification while reducing the profile of the imaging lens.

It is preferable that the imaging lens in the above configuration satisfies a conditional expression (12) below:

$$0.2 < D45/D34 < 3.0 \quad (12)$$

where
D45: a distance along the optical axis between the fourth lens and the fifth lens, and
D34: a distance along the optical axis between the third lens and the fourth lens.

Satisfaction of the conditional expression (12) allows satisfactory correction of astigmatism and coma aberration.

It is preferable that the imaging lens in the above configuration satisfies a conditional expression (13) below:

$$0.2 < D34/T3 < 3.5 \qquad (13)$$

where

D34: a distance along the optical axis between the third lens and the fourth lens, and T3: a thickness along the optical axis of the third lens.

Satisfaction of the conditional expression (13) allows satisfactory correction of field curvature.

It is preferable that the imaging lens in the above configuration satisfies a conditional expression (14) below:

$$15 < vd5 < 35 \qquad (14)$$

where vd5: an abbe number at the d-line of the fifth lens.

Satisfaction of the conditional expression (14) allows satisfactory correction of chromatic aberration.

It is preferable that the imaging lens in the above configuration satisfies a conditional expression (15) below to more satisfactorily correct chromatic aberration:

$$35 < vd6 < 85 \qquad (15)$$

where vd6: an abbe number at the d-line of the sixth lens.

It is preferable that the imaging lens in the above configuration satisfies a conditional expression (16) below to more satisfactorily correct chromatic aberration:

$$35 < vd7 < 85 \qquad (16)$$

where vd7: an abbe number at the d-line of the seventh lens.

It is preferable that the imaging lens in the above configuration satisfies a conditional expression (17) below to more satisfactorily correct chromatic aberration:

$$35 < vd8 < 85 \qquad (17)$$

where vd8: an abbe number at the d-line of the eighth lens.

It is preferable that the imaging lens in the above configuration satisfies a conditional expression (18) below:

$$0 \leq |vd6 - vd7|/vd7 < 0.50 \qquad (18)$$

where vd6: an abbe number at the d-line of the sixth lens, and vd7: an abbe number at the d-line of the seventh lens.

The sixth lens, the seventh lens, and the eighth lens are arranged in positions close to the image plane of the image sensor among the eight lenses. All these three lenses have negative refractive power. As represented by the conditional expressions (15) through (17), chromatic aberration may be even more satisfactorily corrected when the three lenses are formed from a low dispersion material.

It is preferable that the imaging lens of the present invention satisfies a total track/diagonal ratio represented by the conditional expression below to preferably achieve reduction in the profile of the imaging lens:

$$0.5 < TTL/(2 \times ih) < 1.0$$

where

TTL: a distance along the optical axis between the object-side surface of the first lens and the image plane, and ih: a maximum image height on the image plane of the image sensor.

It should be noted that inserts, such as a IR cut filter and a cover glass, are generally arranged between the imaging lens and the image plane while a thickness of a IR cut filter or a cover glass along the optical axis is converted into an air-converted distance.

It is preferable that, in the imaging lens of the present invention, each of the first to the eighth lenses is arranged with an air gap. Arrangement of each lens with an air gap allows the imaging lens of the present invention to have a lens configuration where not even one cemented lens is contained. Such a lens configuration allows all the eight lenses composing the imaging lens to be formed from plastic materials and thus reduction in the production cost of the imaging lens.

It is preferable that, in the imaging lens of the present invention, both surfaces of each of the first to the eighth lenses are formed as aspheric surfaces. Formation of both surfaces of each lens as aspheric surfaces allows more satisfactory correction of aberrations from the paraxial region to the lens periphery.

It is preferable that, when a field of view is given as $2\omega$, the imaging lens of the present invention satisfies $70° \leq 2\omega$. Satisfaction of the present conditional expression allows the imaging lens to have a wider field of view and it is thus possible to achieve a wider field of view as well as a lower profile of the imaging lens.

The surface shapes of each lens herein are specified using signs of the radii of curvature. Whether the radius of curvature is positive or negative is determined in accordance with a general definition, that is, given that the traveling direction of the light is positive, the radius of curvature is considered to be positive if the center of the radius of curvature is on the image plane side viewed from the lens surface and the radius of curvature is considered to be negative if the center is on the object side. Accordingly, an "object-side surface with a positive radius of curvature" refers to a convex object-side surface, and an "object-side surface with a negative radius of curvature" refers to a concave object-side surface. In addition, an "image-side surface with a positive radius of curvature" refers to a concave image-side surface, and an "image-side surface with a negative radius of curvature" refers to a convex image-side surface. It should be noted that the radius of curvature herein refers to a paraxial radius of curvature and may not be consistent with outlines of the lenses in their sectional views.

The imaging lens of the present invention is capable of providing a compact imaging lens particularly suitable for assembly into a small-sized camera while achieving high resolution with satisfactorily corrected aberrations.

DETAILED DESCRIPTION OF EMBODIMENTS

Referring to the accompanying drawings, an embodiment of the present invention will be described in detail below.

FIGS. 1, 3, 5, 7, 9, 11, 13, 15, 17, 19, 21, and 23 are sectional views illustrating schematic configurations of respective imaging lenses according to Examples 1 through 12 of the present embodiment. Since the imaging lenses in these Examples have the same basic configuration, a description is given here to the lens configuration according to the present embodiment with reference to the illustrative sectional view of Example 1.

Figure 1:
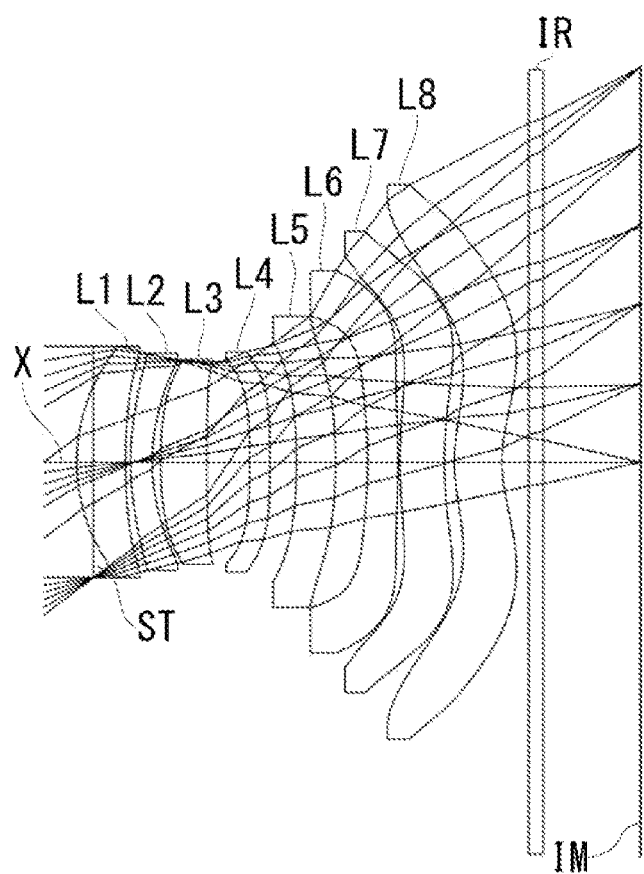
FIG. 1 is a sectional view illustrating a schematic configuration of an imaging lens according to Example 1 of the present invention.

As illustrated in FIG. 1, the imaging lens according to the present embodiment includes: in order from an object side to an image side, a first lens L1 having positive refractive power; a second lens L2 having negative refractive power; a third lens L3 having positive refractive power; a fourth lens L4 having negative refractive power; a fifth lens L5; a sixth lens L6 having negative refractive power; a seventh lens L7 having negative refractive power; and an eighth lens L8 having negative refractive power. Each lens of the first lens L1 to the eighth lens L8 is arranged with an air gap. A filter IR is arranged between the eighth lens L8 and an image plane IM of the image sensor. The filter IR is optional. It should be noted that, unless otherwise specified, refractive power of each lens herein refers to refractive power in a paraxial region.

The first lens L1 has a shape where a radius of curvature r2 of an object-side surface and a radius of curvature r3 of an image-side surface are both positive. The first lens L1 has a shape of a meniscus lens with a convex surface directed toward the object side in a paraxial region. The shape of the first lens L1 is not limited to the shape according to Example 1. The first lens L1 may have a shape to provide positive refractive power. For example, the first lens L1 may have a shape where the radius of curvature r2 is positive and the radius of curvature r3 is negative, that is, a shape providing a biconvex lens in the paraxial region. The first lens L1 may have a shape where the radius of curvature r2 of the object-side surface and the radius of curvature r3 of the image-side surface are both negative and also a shape providing a meniscus lens with a concave surface directed toward the object side in the paraxial region. From the perspective of reduction in the profile of the imaging lens, a shape where the radius of curvature r2 is positive is preferable.

The second lens L2 has a shape where a radius of curvature r4 of an object-side surface and a radius of curvature r5 of an image-side surface (=R2r) are both positive. The second lens L2 has a shape providing a meniscus lens with a convex surface directed toward the object side in a paraxial region. The shape of the second lens L2 is not limited to the shape according to Example 1 and may be a shape to provide negative refractive power. For example, the second lens L2 may have a shape where the radius of curvature r4 is negative and the radius of curvature r5 is positive and also a shape providing a biconcave lens in the paraxial region, or may have a shape providing a meniscus lens with a concave surface directed toward the object side in the paraxial region. From the perspective of reduction in the profile of the imaging lens, it is preferable that the second lens L2 has a shape where the radius of curvature r4 is positive, that is, a shape providing a convex object-side surface in the paraxial region.

The third lens L3 has a shape where a radius of curvature r6 of an object-side surface (=R3f) and a radius of curvature r7 of an image-side surface are both positive. The third lens L3 has a shape providing a meniscus lens with a convex surface directed toward the object side in a paraxial region. The shape of the third lens L3 is not limited to the shape according to Example 1. The third lens L3 may have a shape to provide positive refractive power. The third lens L3 in Example 12 is an example of a shape providing a biconvex lens in the paraxial region. In addition, the third lens L3 may have other shapes such as a shape providing a meniscus lens with a concave surface directed toward the object side in the paraxial region. Considering reduction in the profile of the imaging lens, it is preferable that the third lens L3 has a shape where the radius of curvature r6 is positive.

The fourth lens L4 has a shape where a radius of curvature r8 of an object-side surface and a radius of curvature r9 of an image-side surface are both negative. The fourth lens L4 has a shape providing a meniscus lens with a concave surface directed toward the object side in a paraxial region. The shape of the fourth lens L4 is not limited to the shape according to Example 1. The fourth lens L4 may have a shape to provide negative refractive power. The fourth lens L4 in each of Examples 2, 3, 6, and 9 is an example of a shape providing a biconcave lens in the paraxial region. Meanwhile, the fourth lens L4 in each of Examples 4 and 7 is an example of a shape providing a meniscus lens with a convex surface directed toward the object side in the paraxial region.

The fifth lens L5 has positive refractive power. The refractive power of the fifth lens L5 is not limited to the positive refractive power. The imaging lens according to each of Examples 8 through 12 is an example of a lens configuration where the fifth lens L5 has negative refractive power.

The fifth lens L5 has a shape where a radius of curvature r10 of an object-side surface and a radius of curvature r11 of an image-side surface are both negative. The fifth lens L5 has a shape providing a meniscus lens with a concave surface directed toward the object side in a paraxial region. The shape of the fifth lens L5 is not limited to the shape according to Example 1. The fifth lens L5 may have a shape providing a biconcave lens in the paraxial region, a shape providing a biconvex lens in the paraxial region, or a shape providing a meniscus lens with a convex surface directed toward the object side.

The sixth lens L6 has a shape where a radius of curvature r12 of an object-side surface (=R6f) and a radius of curvature r13 of an image-side surface are both negative. The sixth lens L6 has a shape providing a meniscus lens with a concave surface directed toward the object side in a paraxial region. The shape of the sixth lens L6 is not limited to the shape according to Example 1 and may be a shape providing a concave object-side surface in the paraxial region. The sixth lens L6 in Example 11 is an example of a shape providing a biconcave lens in the paraxial region.

The seventh lens L7 has a shape where a radius of curvature r14 of an object-side surface and a radius of curvature r15 of an image-side surface are both positive. The seventh lens L7 has a shape providing a meniscus lens with a convex surface directed toward the object side in a paraxial region. The shape of the seventh lens L7 is not limited to the shape according to Example 1. The seventh lens L7 may have a shape to provide negative refractive power. The seventh lens L7 may have a shape providing a biconcave lens in the paraxial region or a shape providing a meniscus lens with a concave surface directed toward the object side in the paraxial region.

The eighth lens L8 has a shape where a radius of curvature r16 of an object-side surface and a radius of curvature r17 of an image-side surface are both positive. The eighth lens L8 has a shape providing a meniscus lens with a convex surface directed toward the object side in a paraxial region. The shape of the eighth lens L8 is not limited to the shape according to Example 1. The eighth lens L8 may have a shape to provide negative refractive power. The eighth lens L8 may have a shape providing a biconcave lens in the paraxial region or a shape providing a meniscus lens with a concave surface directed toward the object side in the paraxial region. It should be noted that, to achieve reduction in the profile of the imaging lens and satisfactory correction of aberrations, the eighth lens L8 is preferably formed in a shape directing a concave surface toward the image plane side in the paraxial region.

Both surfaces of the seventh lens L7 and the eighth lens L8 are aspheric and provided with an inflection point. In this context, the inflection point refers to a point where the positive or negative sign of the curvature on a curve, which is a point where the curving direction of the curve changes on the lens surface. Both surfaces of the seventh lens L7 and the eighth lens L8 in the imaging lens according to the present embodiment respectively have an aspheric shape with a pole. Such a shape of the seventh lens L7 and the eighth lens L8 allows satisfactory correction of not only axial chromatic aberration but also off-axial chromatic aberration of magnification as well as preferable control of the incident angle of a ray of light emitted from the imaging lens on the image plane IM within the range of CRA. It should be noted that, depending on the expected optical performance and the extent of reduction in the profile of the imaging lens, the eighth lens L8 may have the other surfaces except the image-side surface formed as aspheric surfaces with no inflection point.

The imaging lens according to the present embodiment satisfies the following conditional expressions (1) through (18):

$$-3.0 < f2/f3 < -0.2 \tag{1}$$

$$1.0 < f3/f < 7.0 \tag{2}$$

$$-30.0 < f4/f3 < -1.0 \tag{3}$$

$$1.0 < f34/f < 6.0 \tag{4}$$

$$-8.0 < f6/f < -1.5 \tag{5}$$

$$-8.0 < f56/f < -1.5 \tag{6}$$

$$0.2 < f7/f8 < 8.5 \tag{7}$$

$$-10.0 < f78/f < -2.5 \tag{8}$$

$$0.2 < f56/f78 < 6.0 \tag{9}$$

$$0.2 < R2r/R3f < 1.0 \tag{10}$$

$$-4.0 < R6f/f < -0.3 \tag{11}$$

$$0.2 < D45/D34 < 3.0 \tag{12}$$

$$0.2 < D34/T3 < 3.5 \tag{13}$$

$$15 < vd5 < 35 \tag{14}$$

$$35 < vd6 < 85 \tag{15}$$

$$35 < vd7 < 85 \tag{16}$$

$$35 < vd8 < 85 \tag{17}$$

$$0 \le |vd6 - vd7|/vd7 < 0.50 \tag{18}$$

where
f: a focal length of the entire optical system of the imaging lens,
f2: a focal length of the second lens L2,
f3: a focal length of the third lens L3,
f4: a focal length of the fourth lens L4,
f6: a focal length of the sixth lens L6, f7: a focal length of the seventh lens L7,
f8: a focal length of the eighth lens L8,
f34: a composite focal length of the third lens L3 and the fourth lens L4,
f56: a composite focal length of the fifth lens L5 and the sixth lens L6,
f78: a composite focal length of the seventh lens L7 and the eighth lens L8,
R2r: a paraxial curvature radius of an image-side surface of the second lens L2,
R3f: a paraxial curvature radius of an object-side surface of the third lens L3,
R6f: a paraxial curvature radius of an object-side surface of the sixth lens L6,
D34: a distance along the optical axis X between the third lens L3 and the fourth lens L4,
D45: a distance along the optical axis X between the fourth lens L4 and the fifth lens L5,
T3: a thickness along the optical axis X of the third lens L3,
vd5: an abbe number at the d-line of the fifth lens L5,
vd6: an abbe number at the d-line of the sixth lens L6,
vd7: an abbe number at the d-line of the seventh lens L7, and
vd8: an abbe number at the d line of the eighth lens L8.

The imaging lens according to the present embodiment satisfies the total track/diagonal ratio represented by the following conditional expression:

$$0.5 < TTL/(2 \times ih) < 1.0$$

where

TTL: a distance along the optical axis X between the object-side surface of the first lens L1 and the image plane IM, and ih: a maximum image height on the image plane IM of the image sensor.

In addition, the imaging lens according to the present embodiment satisfies the following conditional expression:

$$70° \leq 2\omega$$

where

ω: a half field of view.

It should be noted that not all the above conditional expressions have to be satisfied and each of the above conditional expressions may be individually satisfied to obtain the operational advantage corresponding to each conditional expression.

The imaging lens according to the present embodiment exhibits more preferred operational advantage by satisfying conditional expressions (1a) through (13a) below:

$$-2.0 < f2/f3 < -0.5 \quad (1a)$$

$$1.0 < f3/f < 5.0 \quad (2a)$$

$$-25.0 < f4/f3 < -1.5 \quad (3a)$$

$$1.5 < f34/f < 5.0 \quad (4a)$$

$$-7.0 < f6/f < -1.5 \quad (5a)$$

$$-7.0 < f56/f < -1.5 \quad (6a)$$

$$0.3 < f7/f8 < 6.0 \quad (7a)$$

$$-8.0 < f78/f < -2.8 \quad (8a)$$

$$0.3 < f56/f78 < 5.0 \quad (9a)$$

$$0.2 < R2r/R3f < 0.8 \quad (10a)$$

$$-3.5 < R6f/f < -0.5 \quad (11a)$$

$$0.3 < D45/D34 < 2.5 \quad (12a)$$

$$0.4 < D34/T3 < 2.5 \quad (13a).$$

It should be noted that, as the upper limits and the lower limits of these conditional expressions (1a) through (13a), the upper limits and the lower limits of the corresponding conditional expressions (1) through (13) may be applied to the respective conditional expressions (1a) through (13a).

According to the present embodiment, lens surfaces of the respective lenses are formed as aspheric surfaces. An equation that expresses these aspheric surfaces is as below:

$$Z = \frac{C \cdot H^2}{1 + \sqrt{1 - (1+k) \cdot C^2 \cdot H^2}} + \sum (An \cdot H^n) \quad \text{[Equation 1]}$$

where

Z: a distance in the direction of the optical axis,
H: a distance from the optical axis in the direction perpendicular to the optical axis,
C: a paraxial curvature (=1/r, r: paraxial radius of curvature),
k: conic constant, and
An: the nth aspheric coefficient.

Next, Examples of the imaging lens according to the present embodiment will be described. In each table showing basic lens data, f represents a focal length of the entire optical system of the imaging lens, Fno represents an F-number, ω represents a half field of view, ih represents a maximum image height on the image plane IM, and TTL represents a distance along the optical axis between the object-side surface of the first lens L1 and the image plane IM. Additionally, i represents a surface number counted from the object side, r represents a paraxial radius of curvature, d represents a distance between lens surfaces along the optical axis X, nd represents a refractive index at a reference wavelength of 588 nm, and vd represents an abbe number at the reference wavelength. It should be noted that surfaces indicated by surface numbers i affixed with an asterisk (*) are aspheric surfaces.

EXAMPLE 1

The basic lens data is shown below.

TABLE 1

| Example 1 |
|---|
| Unit mm | f = 7.762
Fno = 2.27
ω(°) = 36.8
ih = 5.8
TTL = 8.27

Surface Data

| i | r | d | nd | vd | |
|---|---|---|---|---|---|
| (Object) | Infinity | Infinity | | | |
| 1 (Stop) | Infinity | −0.250 | | | |
| 2* | 2.677 | 0.722 | 1.544 | 56.44 | (vd1) |
| 3* | 7.699 | 0.074 | | | |
| 4* | 3.905 | 0.320 | 1.671 | 19.24 | (vd2) |
| 5* | 2.792 | 0.123 | | | |
| 6* | 5.902 | 0.685 | 1.544 | 56.44 | (vd3) |
| 7* | 40.728 | 0.630 | | | |

TABLE 1-continued

Example 1

| | | | | | |
|---|---|---|---|---|---|
| 8* | −18.554 | 0.300 | 1.544 | 56.44 | (vd4) |
| 9* | −59.570 | 0.402 | | | |
| 10* | −10.984 | 0.576 | 1.680 | 18.42 | (vd5) |
| 11* | −10.294 | 0.476 | | | |
| 12* | −6.257 | 0.447 | 1.535 | 55.69 | (vd6) |
| 13* | −14.587 | 0.030 | | | |
| 14* | 7.519 | 0.656 | 1.535 | 55.69 | (vd7) |
| 15* | 6.595 | 0.144 | | | |
| 16* | 2.576 | 0.706 | 1.535 | 55.69 | (vd8) |
| 17* | 2.124 | 0.400 | | | |
| 18 | Infinity | 0.210 | 1.517 | 64.20 | |
| 19 | Infinity | 1.445 | | | |
| Image Plane | | | | | |

ConstituentLens Data

| Lens | StartSurface | FocalLength | TotalTrack/DiagonalRatio |
|---|---|---|---|
| L1 | 2 | 7.172 | 0.71 |
| L2 | 4 | −16.519 | |
| L3 | 6 | 12.589 | |
| L4 | 8 | −49.622 | |
| L5 | 10 | 180.255 | |
| L6 | 12 | −20.877 | |
| L7 | 14 | −133.257 | |
| L8 | 16 | −49.817 | |

TABLE 2

Aspheric Surface Data

| | 2nd Surface | 3rd Surface | 4th Surface | 5th Surface | 6th Surface | 7th Surface |
|---|---|---|---|---|---|---|
| k | −8.017076E−01 | 0.000000E+00 | −1.154937E+00 | −3.514627E+00 | 0.000000E+00 | 0.000000E+00 |
| A4 | 2.593746E−03 | −2.240388E−02 | −4.528877E−02 | −5.006525E−03 | 2.173294E−02 | −4.157946E−03 |
| A6 | 4.806768E−03 | 4.618116E−02 | 5.210962E−02 | 1.597837E−02 | −1.645623E−02 | 2.886564E−02 |
| A8 | −9.832858E−05 | −3.557137E−02 | −4.239714E−02 | −3.359029E−02 | 3.064603E−02 | −5.741224E−02 |
| A10 | −6.512751E−03 | 8.879230E−03 | 1.405609E−02 | 5.842074E−02 | −2.187957E−02 | 7.218199E−02 |
| A12 | 8.255804E−03 | 8.248670E−03 | 6.573541E−03 | −6.361819E−02 | 3.287537E−03 | −5.142019E−02 |
| A14 | −4.949117E−03 | −8.514213E−03 | −8.382236E−03 | 4.274666E−02 | 6.562115E−03 | 1.909190E−02 |
| A16 | 1.612586E−03 | 3.501365E−03 | 3.498609E−03 | −1.699084E−02 | −4.804148E−03 | −2.151906E−03 |
| A18 | −2.737319E−04 | −7.278077E−04 | −7.034317E−04 | 3.632830E−03 | 1.311708E−03 | −6.556322E−04 |
| A20 | 1.863832E−05 | 6.190769E−05 | 5.660198E−05 | −3.219116E−04 | −1.291383E−04 | 1.631755E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | −2.754436E+02 | −3.061506E+02 | −9.073833E+00 | −2.776039E+01 |
| A4 | −4.424057E−02 | −5.313009E−02 | −7.107755E−02 | −6.911096E−02 | 2.482841E−02 | 1.560053E−03 |
| A6 | 2.109847E−03 | 1.160181E−02 | 4.204458E−02 | 4.950431E−02 | 9.922034E−04 | 1.616110E−02 |
| A8 | −1.200883E−02 | −8.385552E−03 | −1.862914E−02 | −2.659236E−02 | −1.348744E−02 | −1.001018E−02 |
| A10 | 1.454796E−02 | −6.810444E−03 | −9.921771E−04 | 4.939301E−03 | 7.950444E−03 | 2.417309E−03 |
| A12 | −9.419142E−03 | 1.900212E−02 | 7.013345E−03 | 3.375250E−03 | −2.659790E−03 | −2.287221E−04 |
| A14 | 1.158208E−03 | −1.666973E−02 | −4.004416E−03 | −2.486479E−03 | 5.715194E−04 | −1.645972E−05 |
| A16 | 2.098531E−03 | 7.502666E−03 | 1.006520E−03 | 6.956137E−04 | −8.093430E−05 | 6.107306E−06 |
| A18 | −1.170867E−03 | −1.742694E−03 | −1.031579E−04 | −9.303634E−05 | 6.730844E−06 | −5.525963E−07 |
| A20 | 1.899709E−04 | 1.658218E−04 | 1.062161E−06 | 4.909433E−06 | −2.700977E−07 | 1.759887E−08 |

| | 14th Surface | 15th Surface | 16th Surface | 17th Surface |
|---|---|---|---|---|
| k | −3.397817E−02 | 6.695992E−02 | −1.215761E+00 | −5.685665E+00 |
| A4 | −2.398610E−02 | −2.647156E−03 | −1.025805E−01 | −5.104882E−02 |
| A6 | 1.007993E−02 | −2.062844E−03 | 3.078871E−02 | 1.287009E−02 |
| A8 | −6.600300E−03 | −1.539249E−03 | −7.603569E−03 | −2.667577E−03 |
| A10 | 2.218897E−03 | 7.343806E−04 | 1.256651E−03 | 3.706962E−04 |
| A12 | −4.584885E−04 | −1.543669E−04 | −1.310145E−04 | −3.272543E−05 |
| A14 | 5.899371E−05 | 1.813754E−05 | 8.551093E−06 | 1.818574E−06 |
| A16 | −4.487380E−06 | −1.208940E−06 | −3.398209E−07 | −6.209533E−08 |
| A18 | 1.835556E−07 | 4.267160E−08 | 7.546501E−09 | 1.196357E−09 |
| A20 | −3.150692E−09 | −6.202587E−10 | −7.224922E−11 | −9.900442E−12 |

Figure 2:
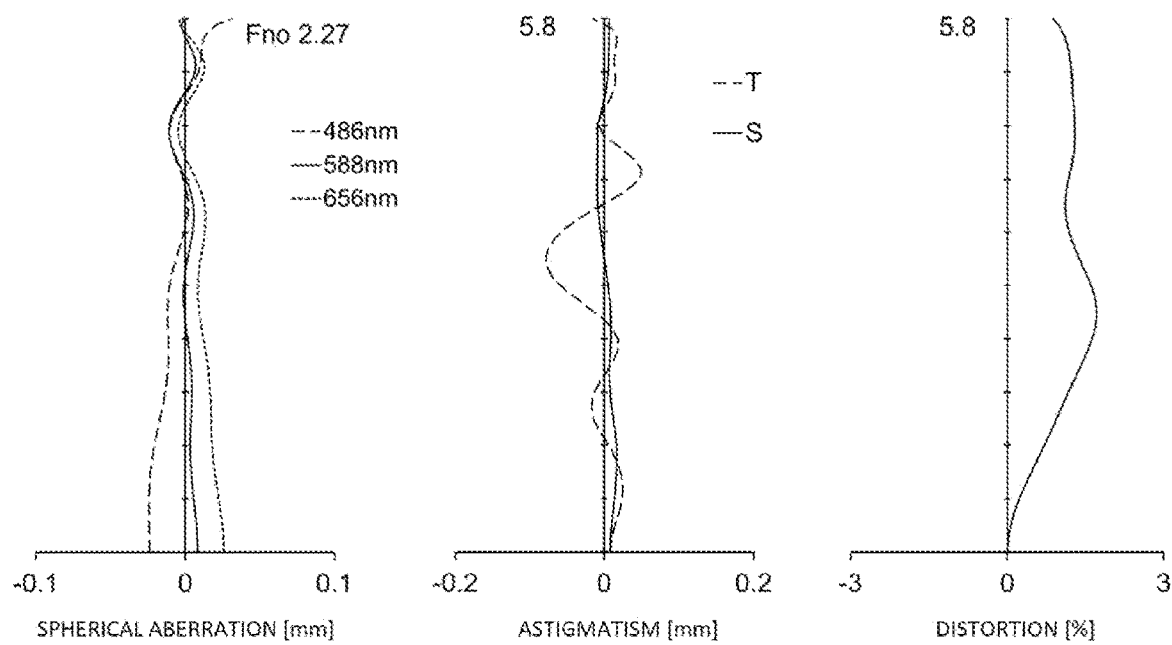
FIG. 2 is an aberration diagram illustrating spherical aberration, astigmatism, and distortion of the imaging lens in FIG. 1.
Figure 3:
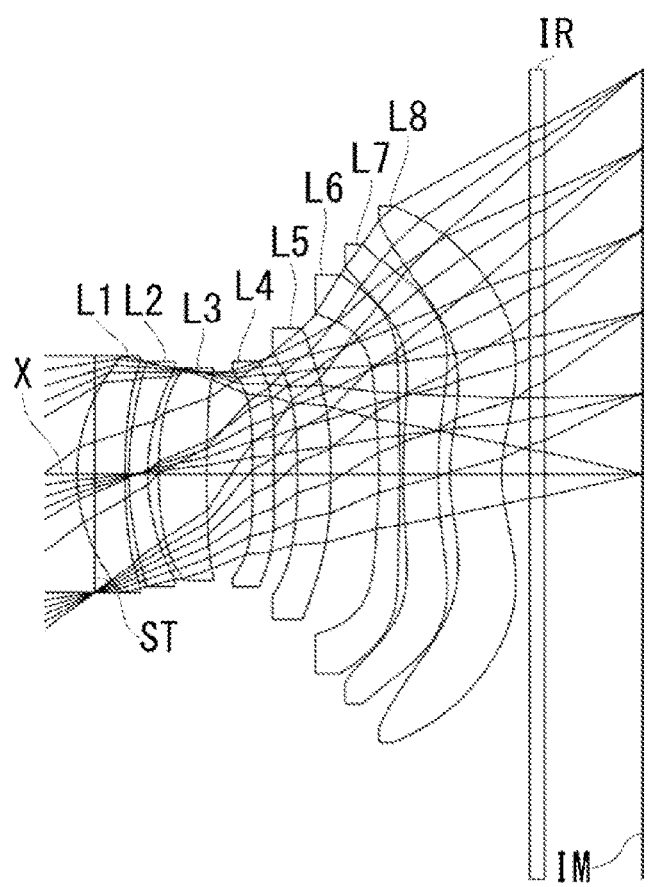
FIG. 3 is a sectional view illustrating a schematic configuration of an imaging lens according to Example 2 of the present invention.

FIG. 2 is an aberration diagram illustrating spherical aberration (mm), astigmatism (mm), and distortion (%) of the imaging lens in Example 1, respectively. The astigmatism diagram and distortion diagram represent the aberrations at the reference wavelength (588 nm). Furthermore, the astigmatism diagram represents a sagittal image surface (S) and a tangential image surface (T), respectively (same in FIGS. 4, 6, 8, 10, 12, 14, 16, 18, 20, 22 and 24). As shown in FIG. 2, the imaging lens according to Example 1 is capable of satisfactorily correcting the aberrations.

EXAMPLE 2

The basic lens data is shown below.

TABLE 3

| Example 2 |
|---|
| Unit mm |
| f = 7.747 |
| Fno = 2.29 |
| ω(°) = 36.8 |

TABLE 3-continued

Example 2 h = 5.8
TTL = 8.01

Surface Data

| i | r | d | nd | νd | |
|---|---|---|---|---|---|
| (Object) | Infinity | Infinity | | | |
| 1 (Stop) | Infinity | −0.250 | | | |
| 2* | 2.511 | 0.683 | 1.544 | 56.44 | (vd1) |
| 3* | 7.217 | 0.055 | | | |
| 4* | 3.975 | 0.272 | 1.671 | 19.24 | (vd2) |
| 5* | 2.794 | 0.152 | | | |
| 6* | 5.552 | 0.689 | 1.544 | 56.44 | (vd3) |
| 7* | 23.348 | 0.654 | | | |
| 8* | −46.401 | 0.300 | 1.544 | 56.44 | (vd4) |
| 9* | 24.932 | 0.347 | | | |
| 10* | −12.090 | 0.477 | 1.680 | 18.42 | (vd5) |
| 11* | −10.152 | 0.686 | | | |
| 12* | −6.798 | 0.297 | 1.535 | 55.69 | (vd6) |
| 13* | −14.616 | 0.045 | | | |
| 14* | 7.979 | 0.502 | 1.535 | 55.69 | (vd7) |
| 15* | 6.357 | 0.165 | | | |
| 16* | 2.672 | 0.740 | 1.535 | 55.69 | (vd8) |
| 17* | 2.210 | 0.400 | | | |
| 18 | Infinity | 0.210 | 1.517 | 64.20 | |
| 19 | Infinity | 1.403 | | | |
| Image Plane | | | | | |

ConstituentLens Data

| Lens | StartSurface | FocalLength | TotalTrack/DiagonalRatio |
|---|---|---|---|
| L1 | 2 | 6.727 | 0.69 |
| L2 | 4 | −15.449 | |
| L3 | 6 | 13.199 | |
| L4 | 8 | −29.744 | |
| L5 | 10 | 84.719 | |
| L6 | 12 | −24.084 | |
| L7 | 14 | −65.534 | |
| L8 | 16 | −54.115 | |

TABLE 4

Aspheric Surface Data

| | 2nd Surface | 3rd Surface | 4th Surface | 5th Surface | 6th Surface | 7th Surface |
|---|---|---|---|---|---|---|
| k | −7.820970E−01 | 0.000000E+00 | −1.161647E+00 | −3.479995E+00 | 0.000000E+00 | 0.000000E+00 |
| A4 | 2.761741E−03 | −2.240932E−02 | −4.531387E−02 | −5.016011E−03 | 2.189403E−02 | −4.569668E−03 |
| A6 | 4.832446E−03 | 4.610722E−03 | 5.215648E−02 | 1.594086E−02 | −1.629993E−02 | 2.886452E−02 |
| A8 | −9.983651E−05 | −3.559348E−03 | −4.238439E−02 | −3.361867E−02 | 3.073025E−02 | −5.743567E−02 |
| A10 | −6.516398E−03 | 8.877858E−03 | 1.405271E−02 | 5.840492E−02 | −2.184327E−02 | 7.222064E−02 |
| A12 | 8.253340E−03 | 8.249083E−03 | 6.572578E−03 | −6.362332E−02 | 3.292563E−03 | −5.140755E−02 |
| A14 | −4.950188E−03 | −8.514180E−03 | −8.382295E−03 | 4.274399E−02 | 6.565616E−03 | 1.909683E−02 |
| A16 | 1.612172E−03 | 3.501290E−03 | 3.498839E−03 | −1.699142E−02 | −4.802901E−03 | −2.146674E−03 |
| A18 | −2.738429E−04 | −7.278401E−04 | −7.032865E−04 | 3.633012E−03 | 1.311949E−03 | −6.570005E−04 |
| A20 | 1.860366E−05 | 6.192342E−05 | 5.666109E−05 | −3.216883E−04 | −1.292612E−04 | 1.624377E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | −3.224567E+02 | −2.232621E+02 | −1.089364E+01 | −7.569237E+01 |
| A4 | −4.541839E−02 | −5.090638E−02 | −7.178340E−02 | −7.004843E−02 | 2.688175E−02 | 3.779411E−04 |
| A6 | 1.936118E−03 | 1.231084E−02 | 4.145660E−02 | 4.948098E−02 | 1.513091E−03 | 1.599628E−02 |
| A8 | −1.188772E−02 | −8.294172E−03 | −1.877228E−02 | −2.655757E−02 | −1.352465E−02 | −1.000495E−02 |
| A10 | 1.451133E−02 | −6.781149E−03 | −1.012107E−03 | 4.938382E−03 | 7.927129E−03 | 2.418411E−03 |
| A12 | −9.417292E−03 | 1.901274E−02 | 7.010336E−03 | 3.374672E−03 | −2.658843E−03 | −2.284435E−04 |
| A14 | 1.150105E−03 | −1.666813E−02 | −4.003939E−03 | −2.486644E−03 | 5.731988E−04 | −1.643464E−05 |
| A16 | 2.092745E−03 | 7.504127E−03 | 1.007143E−03 | 6.955518E−04 | −8.052641E−05 | 6.110219E−06 |
| A18 | −1.171872E−03 | −1.741870E−03 | −1.031442E−04 | −9.304922E−05 | 6.778405E−06 | −5.527156E−07 |
| A20 | 1.914480E−04 | 1.665266E−04 | 1.123616E−06 | 4.906474E−06 | −2.676742E−07 | 1.762515E−08 |

| | 14th Surface | 15th Surface | 16th Surface | 17th Surface |
|---|---|---|---|---|
| k | −1.224281E−01 | −6.317043E−01 | −1.209155E+00 | −5.675228E+00 |
| A4 | −2.397364E−02 | −3.001626E−03 | −1.025304E−01 | −5.185982E−02 |
| A6 | 1.007614E−02 | −2.119971E−03 | 3.078763E−02 | 1.289761E−02 |
| A8 | −6.602859E−03 | −1.537473E−03 | −7.603582E−03 | −2.666440E−03 |
| A10 | 2.218656E−03 | 7.345982E−04 | 1.256638E−03 | 3.703515E−04 |
| A12 | −4.584762E−04 | −1.543648E−04 | −1.310153E−04 | −3.273643E−05 |
| A14 | 5.899271E−05 | 1.813811E−05 | 8.551059E−06 | 1.818368E−06 |
| A16 | −4.487019E−06 | −1.208904E−06 | −3.398274E−07 | −6.210310E−08 |
| A18 | 1.835362E−07 | 4.267432E−08 | 7.546504E−09 | 1.196024E−09 |
| A20 | −3.148980E−09 | −6.198416E−10 | −7.224558E−11 | −9.896367E−12 |

Figure 4:
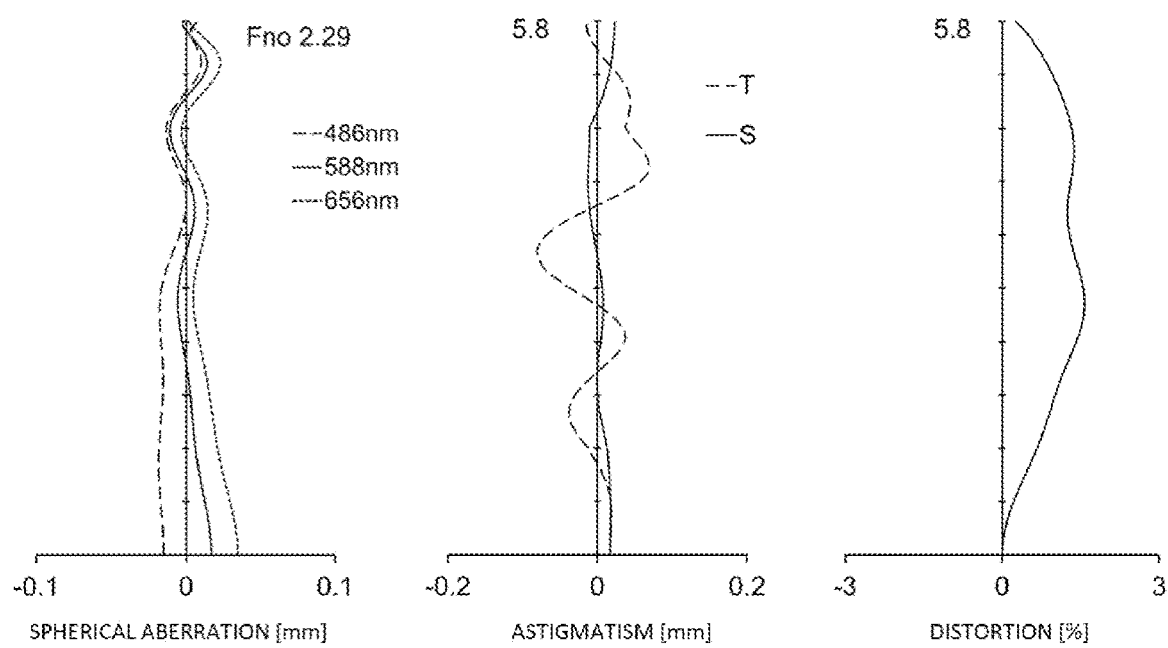
FIG. 4 is an aberration diagram illustrating spherical aberration, astigmatism, and distortion of the imaging lens in FIG. 3.
Figure 5:
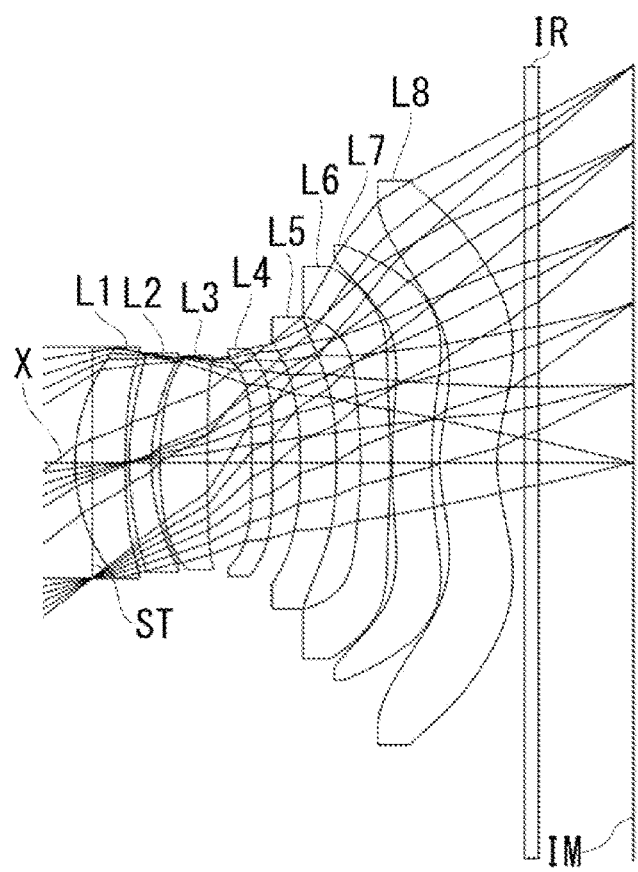
FIG. 5 is a sectional view illustrating a schematic configuration of an imaging lens according to Example 3 of the present invention.

As illustrated in FIG. 4, the imaging lens according to Example 2 is also capable of satisfactorily correcting the aberrations.

EXAMPLE 3

The basic lens data is shown below.

TABLE 5

Example 3

Unit mm $f = 7.427$
$Fno = 2.19$
$\omega(°) = 38.0$
$h = 5.8$
$TTL = 8.11$

Surface Data

| i | r | d | nd | vd | |
|---|---|---|---|---|---|
| (Object) | Infinity | Infinity | | | |
| 1 (Stop) | Infinity | −0.250 | | | |
| 2* | 2.680 | 0.732 | 1.544 | 56.44 | (vd1) |
| 3* | 7.841 | 0.058 | | | |
| 4* | 3.900 | 0.324 | 1.671 | 19.24 | (vd2) |
| 5* | 2.792 | 0.130 | | | |
| 6* | 6.036 | 0.691 | 1.544 | 56.44 | (vd3) |

TABLE 5-continued

Example 3

| | | | | | |
|---|---|---|---|---|---|
| 7* | 47.785 | 0.647 | | | |
| 8* | −60.951 | 0.300 | 1.544 | 56.44 | (vd4) |
| 9* | 46.723 | 0.418 | | | |
| 10* | −10.711 | 0.530 | 1.671 | 19.24 | (vd5) |
| 11* | −10.167 | 0.354 | | | |
| 12* | −5.838 | 0.431 | 1.567 | 37.40 | (vd6) |
| 13* | −12.054 | 0.030 | | | |
| 14* | 7.451 | 0.576 | 1.535 | 55.69 | (vd7) |
| 15* | 6.441 | 0.119 | | | |
| 16* | 2.509 | 0.837 | 1.535 | 55.69 | (vd8) |
| 17* | 2.163 | 0.400 | | | |
| 18 | Infinity | 0.210 | 1.517 | 64.20 | |
| 19 | Infinity | 1.393 | | | |
| Image Plane | | | | | |

Constituent Lens Data

| Lens | StartSurface | FocalLength | TotalTrack/DiagonalRatio |
|---|---|---|---|
| L1 | 2 | 7.122 | 0.70 |
| L2 | 4 | −16.602 | |
| L3 | 6 | 12.615 | |
| L4 | 8 | −48.530 | |
| L5 | 10 | 214.461 | |
| L6 | 12 | −20.471 | |
| L7 | 14 | −110.831 | |
| L8 | 16 | −184.005 | |

TABLE 6

Aspheric Surface Data

| | 2nd Surface | 3rd Surface | 4th Surface | 5th Surface | 6th Surface | 7th Surface |
|---|---|---|---|---|---|---|
| k | −8.030111E−01 | 0.000000E+00 | −1.170305E+00 | −3.506672E+00 | 0.000000E+00 | 0.000000E+00 |
| A4 | 2.599278E−03 | −2.236793E−02 | −4.534383E−02 | −4.997563E−03 | 2.166115E−02 | −4.270251E−03 |
| A6 | 4.760341E−03 | 4.620835E−02 | 5.209272E−02 | 1.600435E−02 | −1.646671E−02 | 2.876159E−02 |
| A8 | −1.106083E−04 | −3.556406E−02 | −4.239653E−02 | −3.359356E−02 | 3.066189E−02 | −5.745723E−02 |
| A10 | −6.513624E−03 | 8.880695E−03 | 1.405426E−02 | 5.841757E−02 | −2.186801E−02 | 7.220837E−02 |
| A12 | 8.255943E−03 | 8.249023E−03 | 6.573312E−03 | −6.361557E−02 | 3.284167E−03 | −5.142352E−02 |
| A14 | −4.948968E−03 | −8.514119E−03 | −8.382103E−03 | 4.274843E−02 | 6.560691E−03 | 1.908585E−02 |
| A16 | 1.612597E−03 | 3.501398E−03 | 3.498811E−03 | −1.698982E−02 | −4.804733E−03 | −2.152158E−03 |
| A18 | −2.737177E−04 | −7.278063E−04 | −7.032897E−04 | 3.633341E−03 | 1.311481E−03 | −6.572623E−04 |
| A20 | 1.864203E−05 | 6.192242E−05 | 5.666797E−05 | −3.218069E−04 | −1.290837E−04 | 1.630877E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | −1.132967E+01 | −3.512271E+01 |
| A4 | −4.394859E−02 | −5.341124E−02 | −7.073947E−02 | −6.927860E−02 | 2.600643E−02 | 1.120497E−03 |
| A6 | 2.272344E−03 | 1.150091E−02 | 4.223377E−02 | 4.944721E−02 | 1.029657E−02 | 1.608445E−02 |
| A8 | −1.195528E−02 | −8.404802E−03 | −1.858972E−02 | −2.654818E−02 | −1.356755E−02 | −1.001073E−02 |
| A10 | 1.450174E−02 | −6.807246E−03 | −9.875866E−04 | 4.944461E−03 | 7.939523E−03 | 2.418054E−03 |
| A12 | −9.405036E−03 | 1.900504E−02 | 7.013623E−03 | 3.375968E−03 | −2.658792E−03 | −2.284645E−04 |
| A14 | 1.162871E−03 | −1.667232E−02 | −4.004198E−03 | −2.486411E−03 | 5.718576E−04 | −1.643004E−05 |
| A16 | 2.095889E−03 | 7.500984E−03 | 1.006813E−03 | 6.956121E−04 | −8.096976E−05 | 6.110545E−06 |
| A18 | −1.170797E−03 | −1.742991E−03 | −1.032361E−04 | −9.304121E−05 | 6.709433E−06 | −5.526653E−07 |
| A20 | 1.893579E−04 | 1.660678E−04 | 1.014988E−06 | 4.907423E−06 | −2.675434E−07 | 1.762091E−08 |

| | 14th Surface | 15th Surface | 16th Surface | 17th Surface |
|---|---|---|---|---|
| k | −1.295753E+00 | 3.064777E−02 | −1.221343E+00 | −4.888969E+00 |
| A4 | −2.451333E−02 | −2.222579E−03 | −1.025689E−01 | −5.070537E−02 |
| A6 | 1.010169E−02 | −2.130268E−03 | 3.079078E−02 | 1.284881E−02 |
| A8 | −6.599748E−03 | −1.548673E−03 | −7.603430E−03 | −2.667916E−03 |
| A10 | 2.218825E−03 | 7.334460E−04 | 1.256657E−03 | 3.707010E−04 |
| A12 | −4.584928E−04 | −1.544350E−04 | −1.310143E−04 | −3.272499E−05 |
| A14 | 5.899269E−05 | 1.813360E−05 | 8.551111E−06 | 1.818621E−06 |
| A16 | −4.487428E−06 | −1.209161E−06 | −3.398214E−07 | −6.209336E−08 |
| A18 | 1.835576E−07 | 4.266243E−08 | 7.546501E−09 | 1.196480E−09 |
| A20 | −3.151221E−09 | −6.202198E−10 | −7.224319E−11 | −9.894041E−12 |

Figure 6:
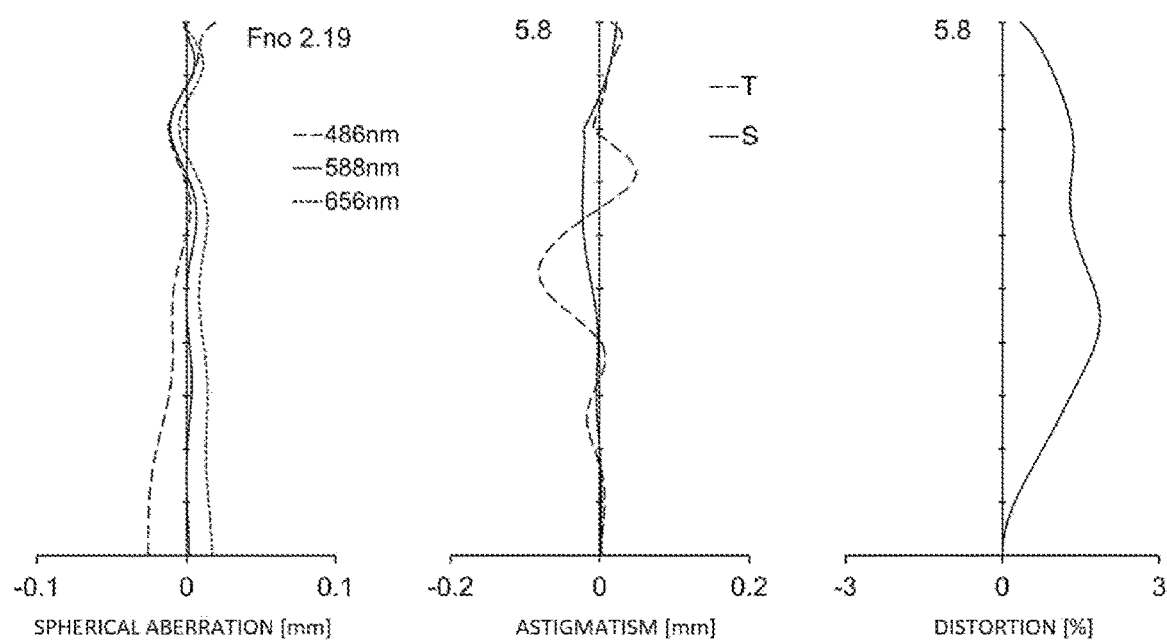
FIG. 6 is an aberration diagram illustrating spherical aberration, astigmatism, and distortion of the imaging lens in FIG. 5.
Figure 7:
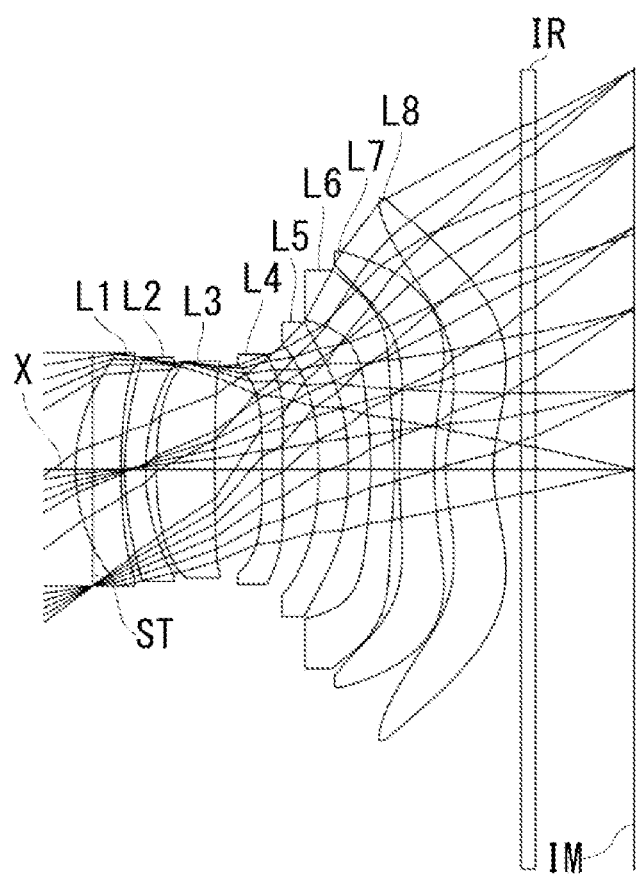
FIG. 7 is a sectional view illustrating a schematic configuration of an imaging lens according to Example 4 of the present invention.

As illustrated in FIG. 6, the imaging lens according to Example 3 is also capable of satisfactorily correcting the aberrations.

EXAMPLE 4

The basic lens data is shown below.

TABLE 7

Example 4

Unit mm f = 7.757
Fno = 2.29
ω(°) = 36.8
h = 5.8
TTL = 8.05

Surface Data

| i | r | d | nd | vd | |
|---|---|---|---|---|---|
| (Object) | Infinity | Infinity | | | |
| 1 (Stop) | Infinity | −0.250 | | | |
| 2* | 2.555 | 0.658 | 1.544 | 56.44 | (vd1) |
| 3* | 7.532 | 0.057 | | | |
| 4* | 4.032 | 0.303 | 1.671 | 19.24 | (vd2) |
| 5* | 2.795 | 0.157 | | | |
| 6* | 5.524 | 0.849 | 1.544 | 56.44 | (vd3) |

TABLE 7-continued

Example 4

| | | | | | |
|---|---|---|---|---|---|
| 7* | 40.869 | 0.685 | | | |
| 8* | 152.780 | 0.300 | 1.544 | 56.44 | (vd4) |
| 9* | 13.807 | 0.525 | | | |
| 10* | −7.327 | 0.426 | 1.671 | 19.24 | (vd5) |
| 11* | −7.337 | 0.333 | | | |
| 12* | −5.287 | 0.337 | 1.567 | 37.40 | (vd6) |
| 13* | −7.647 | 0.080 | | | |
| 14* | 9.073 | 0.505 | 1.535 | 55.69 | (vd7) |
| 15* | 6.354 | 0.165 | | | |
| 16* | 2.687 | 0.695 | 1.535 | 55.69 | (vd8) |
| 17* | 2.296 | 0.400 | | | |
| 18 | Infinity | 0.210 | 1.517 | 64.20 | |
| 19 | Infinity | 1.435 | | | |
| Image Plane | | | | | |

Constituent Lens Data

| Lens | Start Surface | Focal Length | Total Track/Diagonal Ratio |
|---|---|---|---|
| L1 | 2 | 6.785 | 0.70 |
| L2 | 4 | −15.060 | |
| L3 | 6 | 11.634 | |
| L4 | 8 | −27.901 | |
| L5 | 10 | 499.828 | |
| L6 | 12 | −31.845 | |
| L7 | 14 | −42.389 | |
| L8 | 16 | −77.589 | |

TABLE 8

Aspheric Surface Data

| | 2nd Surface | 3rd Surface | 4th Surface | 5th Surface | 6th Surface | 7th Surface |
|---|---|---|---|---|---|---|
| k | −8.041223E−01 | 0.000000E+00 | −1.020440E+00 | −3.437716E+00 | 0.000000E+00 | 0.000000E+00 |
| A4 | 2.563412E−03 | −2.191834E−02 | −4.489529E−02 | −4.699672E−03 | 2.152330E−02 | −6.459334E−03 |
| A6 | 4.684377E−03 | 4.610173E−02 | 5.231442E−02 | 1.634454E−02 | −1.581784E−02 | 2.850194E−02 |
| A8 | −1.112776E−04 | −3.563837E−02 | −4.236099E−02 | −3.330982E−02 | 3.078319E−02 | −5.766790E−02 |
| A10 | −6.527756E−03 | 8.864263E−03 | 1.405475E−02 | 5.849684E−02 | −2.189648E−02 | 7.219855E−02 |
| A12 | 8.246715E−03 | 8.242784E−03 | 6.576950E−03 | −6.360834E−02 | 3.287472E−02 | −5.139650E−02 |
| A14 | −4.952837E−03 | −8.517289E−03 | −8.379394E−03 | 4.273037E−02 | 6.558575E−03 | 1.910043E−02 |
| A16 | 1.611572E−03 | 3.500286E−03 | 3.499425E−03 | −1.699744E−02 | −4.802739E−03 | −2.147183E−03 |
| A18 | −2.739476E−04 | −7.279884E−04 | −7.035453E−04 | 3.632065E−03 | 1.312553E−03 | −6.560082E−04 |
| A20 | 1.865646E−05 | 6.200382E−05 | 5.632902E−05 | −3.210952E−04 | −1.299120E−04 | 1.615323E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | −7.740153E+00 | −2.864142E+01 |
| A4 | −5.597766E−02 | −5.427419E−02 | −6.866487E−02 | −7.286291E−02 | 2.686596E−02 | 2.624898E−03 |
| A6 | 1.471152E−03 | 1.247207E−02 | 4.213314E−02 | 4.949878E−02 | 1.746111E−03 | 1.597922E−02 |
| A8 | −1.206084E−02 | −8.370736E−03 | −1.880943E−02 | −2.649478E−02 | −1.375667E−02 | −1.002243E−02 |
| A10 | 1.454392E−02 | −6.850737E−03 | −1.014487E−03 | 4.956404E−03 | 7.908719E−03 | 2.417796E−03 |
| A12 | −9.386875E−03 | 1.903324E−02 | 7.027038E−03 | 3.377294E−03 | −2.652726E−03 | −2.283976E−04 |
| A14 | 1.161103E−03 | −1.665551E−02 | −3.999614E−03 | −2.486502E−03 | 5.737817E−04 | −1.641705E−05 |
| A16 | 2.092218E−03 | 7.507429E−03 | 1.006803E−03 | 6.955289E−04 | −8.067453E−05 | 6.111905E−06 |
| A18 | −1.171901E−03 | −1.741773E−03 | −1.032602E−04 | −9.306251E−05 | 6.670337E−06 | −5.526130E−07 |
| A20 | 1.899303E−04 | 1.647074E−04 | 9.727567E−07 | 4.902462E−06 | −2.888289E−07 | 1.760927E−08 |

| | 14th Surface | 15th Surface | 16th Surface | 17th Surface |
|---|---|---|---|---|
| k | −3.194244E+00 | −2.168468E−01 | −1.113069E+00 | −5.747594E+00 |
| A4 | −2.673414E−02 | −2.141577E−03 | −1.022483E−01 | −5.422458E−02 |
| A6 | 1.040712E−02 | −2.247186E−03 | 3.078640E−02 | 1.289548E−02 |
| A8 | −6.597095E−03 | −1.525199E−03 | −7.604045E−03 | −2.665669E−03 |
| A10 | 2.218891E−03 | 7.348085E−04 | 1.256612E−03 | 3.707847E−04 |
| A12 | −4.584987E−04 | −1.544061E−04 | −1.310173E−04 | −3.272196E−05 |
| A14 | 5.898958E−05 | 1.812692E−05 | 8.550953E−06 | 1.818741E−06 |
| A16 | −4.487720E−06 | −1.211355E−06 | −3.398269E−07 | −6.208973E−08 |
| A18 | 1.835325E−07 | 4.265602E−08 | 7.546683E−09 | 1.196642E−09 |
| A20 | −3.153753E−09 | −6.334678E−10 | −7.217240E−11 | −9.884904E−12 |

Figure 8:
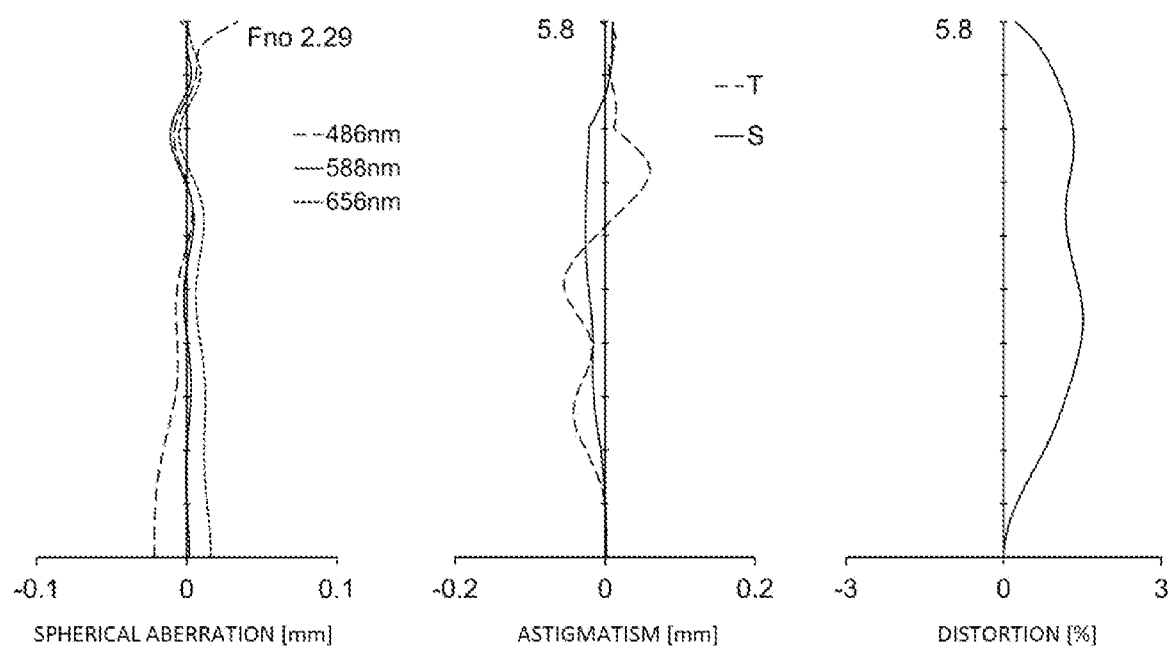
FIG. 8 is an aberration diagram illustrating spherical aberration, astigmatism, and distortion of the imaging lens in FIG. 7.
Figure 9:
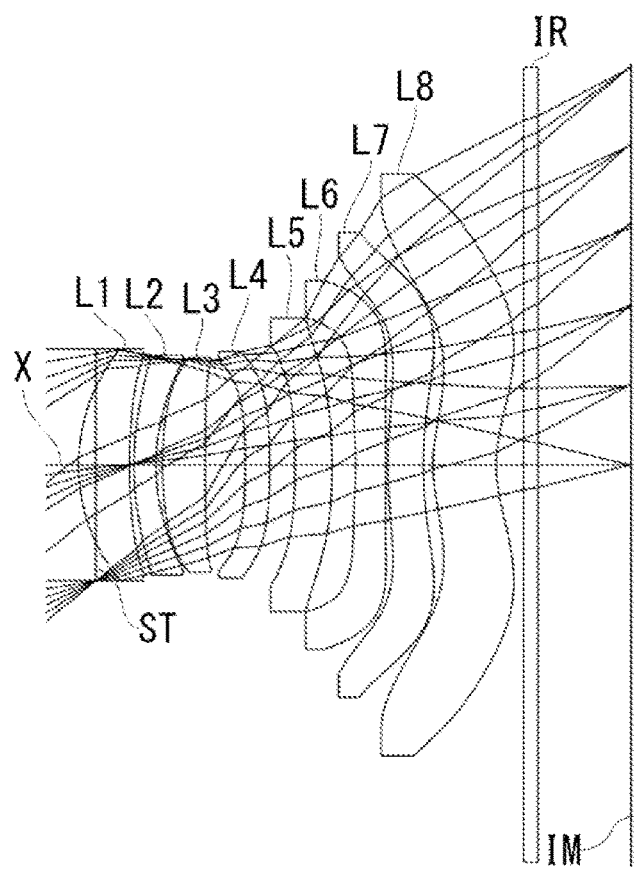
FIG. 9 is a sectional view illustrating a schematic configuration of an imaging lens according to Example 5 of the present invention.

As illustrated in FIG. 8, the imaging lens according to Example 4 is also capable of satisfactorily correcting the aberrations.

EXAMPLE 5

The basic lens data is shown below.

TABLE 9

Example 5

Unit mm f = 7.168
Fno = 2.12
ω(°) = 39.0
h = 5.8
TTL = 7.98

Surface Data

| i | r | d | nd | vd | |
|---|---|---|---|---|---|
| (Object) | Infinity | Infinity | | | |
| 1 (Stop) | Infinity | −0.250 | | | |
| 2* | 2.687 | 0.740 | 1.544 | 56.44 | (vd1) |
| 3* | 7.858 | 0.065 | | | |
| 4* | 3.880 | 0.320 | 1.671 | 19.24 | (vd2) |
| 5* | 2.778 | 0.095 | | | |
| 6* | 5.896 | 0.622 | 1.544 | 56.44 | (vd3) |

TABLE 9-continued

Example 5

| | | | | | |
|---|---|---|---|---|---|
| 7* | 38.596 | 0.583 | | | |
| 8* | −12.339 | 0.350 | 1.544 | 56.44 | (vd4) |
| 9* | −22.222 | 0.381 | | | |
| 10* | −14.557 | 0.538 | 1.680 | 18.42 | (vd5) |
| 11* | −13.248 | 0.341 | | | |
| 12* | −9.565 | 0.445 | 1.535 | 55.69 | (vd6) |
| 13* | −36.190 | 0.030 | | | |
| 14* | 7.074 | 0.513 | 1.535 | 55.69 | (vd7) |
| 15* | 6.091 | 0.142 | | | |
| 16* | 2.436 | 0.914 | 1.535 | 55.69 | (vd8) |
| 17* | 2.048 | 0.400 | | | |
| 18 | Infinity | 0.210 | 1.517 | 64.20 | |
| 19 | Infinity | 1.362 | | | |
| Image Plane | | | | | |

Constituent Lens Data

| Lens | StartSurface | FocalLength | TotalTrack/DiagonalRatio |
|---|---|---|---|
| L1 | 2 | 7.139 | 0.69 |
| L2 | 4 | −16.506 | |
| L3 | 6 | 12.697 | |
| L4 | 8 | −51.604 | |
| L5 | 10 | 185.828 | |
| L6 | 12 | −24.452 | |
| L7 | 14 | −100.068 | |
| L8 | 16 | −134.358 | |

TABLE 10

Aspheric Surface Data

| | 2nd Surface | 3rd Surface | 4th Surface | 5th Surface | 6th Surface | 7th Surface |
|---|---|---|---|---|---|---|
| k | −8.025610E−01 | 0.000000E+00 | −1.203348E+00 | −3.477405E+00 | 0.000000E+00 | 0.000000E+00 |
| A4 | 2.601075E−03 | −2.235104E−02 | −4.535355E−02 | −4.964977E−02 | 2.166709E−02 | −4.240536E−03 |
| A6 | 4.771387E−03 | 4.617879E−02 | 5.209794E−02 | 1.597315E−02 | −1.636778E−02 | 2.848283E−02 |
| A8 | −1.069115E−04 | −3.557271E−02 | −4.240084E−02 | −3.360037E−02 | 3.066174E−02 | −5.755659E−02 |
| A10 | −6.511732E−03 | 8.879870E−03 | 1.404965E−02 | 5.842123E−02 | −2.187432E−02 | 7.220839E−02 |
| A12 | 8.256617E−03 | 8.248604E−03 | 6.572177E−03 | −6.361378E−02 | 3.281816E−03 | −5.141811E−02 |
| A14 | −4.948612E−03 | −8.514185E−03 | −8.382766E−03 | 4.274690E−02 | 6.562018E−03 | 1.908620E−02 |
| A16 | 1.612754E−03 | 3.501415E−03 | 3.498557E−03 | −1.699102E−02 | −4.803754E−03 | −2.154113E−03 |
| A18 | −2.736759E−04 | −7.277813E−04 | −7.034227E−04 | 3.632643E−03 | 1.311783E−03 | −6.568411E−04 |
| A20 | 1.864065E−05 | 6.192031E−05 | 5.663934E−05 | −3.221088E−04 | −1.293102E−04 | 1.640267E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | −3.188763E+02 | −2.187470E+02 | −2.925338E+01 | 1.304089E+02 |
| A4 | −4.355960E−02 | −5.358452E−02 | −7.137777E−02 | −6.899812E−02 | 2.603867E−02 | 1.291264E−04 |
| A6 | 2.820024E−03 | 1.129669E−02 | 4.155293E−02 | 4.949337E−02 | 4.735942E−02 | 1.598880E−02 |
| A8 | −1.181471E−02 | −8.312103E−03 | −1.874026E−02 | −2.658767E−02 | −1.352348E−02 | −1.002780E−02 |
| A10 | 1.451666E−02 | −6.749364E−03 | −1.010014E−03 | 4.936271E−03 | 7.966294E−03 | 2.418218E−03 |
| A12 | −9.419622E−03 | 1.904158E−02 | 7.032486E−03 | 3.374756E−03 | −2.655746E−03 | −2.285486E−04 |
| A14 | 1.163226E−03 | −1.666921E−02 | −3.999041E−03 | −2.486487E−03 | 5.717121E−04 | −1.646949E−05 |
| A16 | 2.099557E−03 | 7.497979E−03 | 1.006102E−03 | 6.956062E−04 | −8.101440E−05 | 6.100186E−06 |
| A18 | −1.168498E−03 | −1.742969E−03 | −1.035134E−04 | −9.303892E−05 | 6.692591E−06 | −5.540012E−07 |
| A20 | 1.901145E−04 | 1.663862E−04 | 8.940844E−07 | 4.910782E−06 | −2.723377E−07 | 1.747859E−08 |

| | 14th Surface | 15th Surface | 16th Surface | 17th Surface |
|---|---|---|---|---|
| k | 2.252207E−01 | 8.198137E−01 | −1.167918E+00 | −4.284976E+00 |
| A4 | −2.397665E−02 | −2.016763E−03 | −1.024014E−01 | −5.146347E−02 |
| A6 | 1.010309E−02 | −2.063348E−03 | 3.079071E−02 | 1.290621E−02 |
| A8 | −6.598016E−03 | −1.543275E−03 | −7.603352E−03 | −2.666390E−03 |
| A10 | 2.218890E−03 | 7.341264E−04 | 1.256655E−03 | 3.707358E−04 |
| A12 | −4.584929E−04 | −1.543802E−04 | −1.310144E−04 | −3.272501E−05 |
| A14 | 5.899275E−05 | 1.813716E−05 | 8.551040E−06 | 1.818582E−06 |
| A16 | −4.487300E−06 | −1.208900E−06 | −3.398228E−07 | −6.209867E−08 |
| A18 | 1.835352E−07 | 4.268659E−08 | 7.546449E−09 | 1.196029E−09 |
| A20 | −3.144673E−09 | −6.193376E−10 | −7.225654E−11 | −9.929291E−12 |

Figure 10:
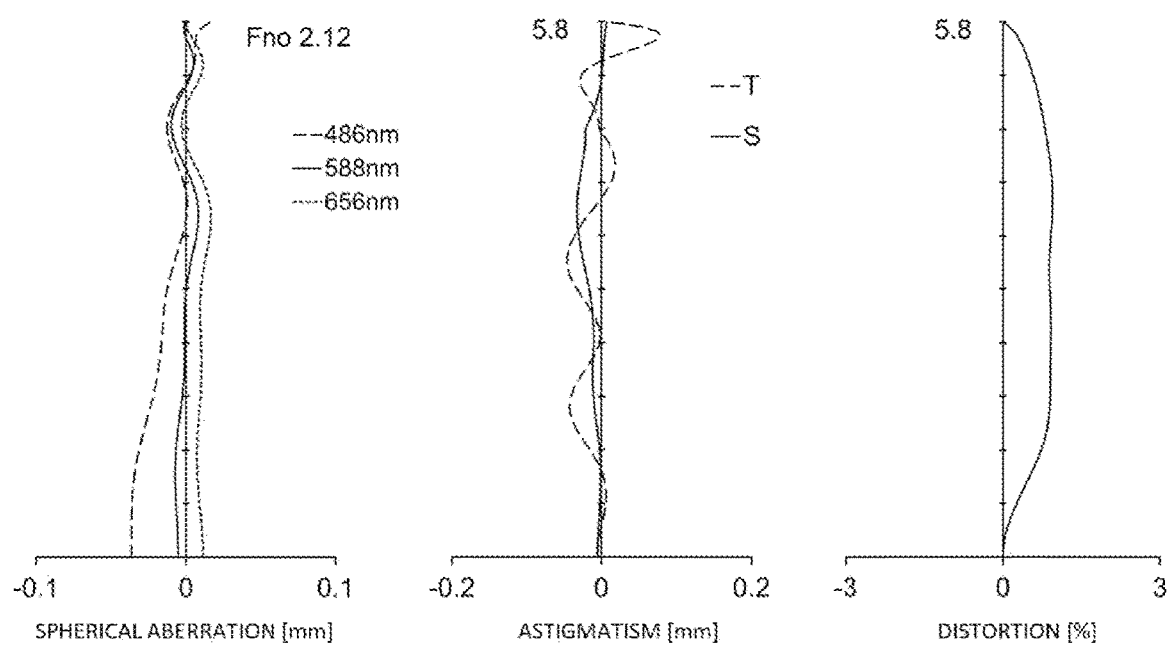
FIG. 10 is an aberration diagram illustrating spherical aberration, astigmatism, and distortion of the imaging lens in FIG. 9.
Figure 11:
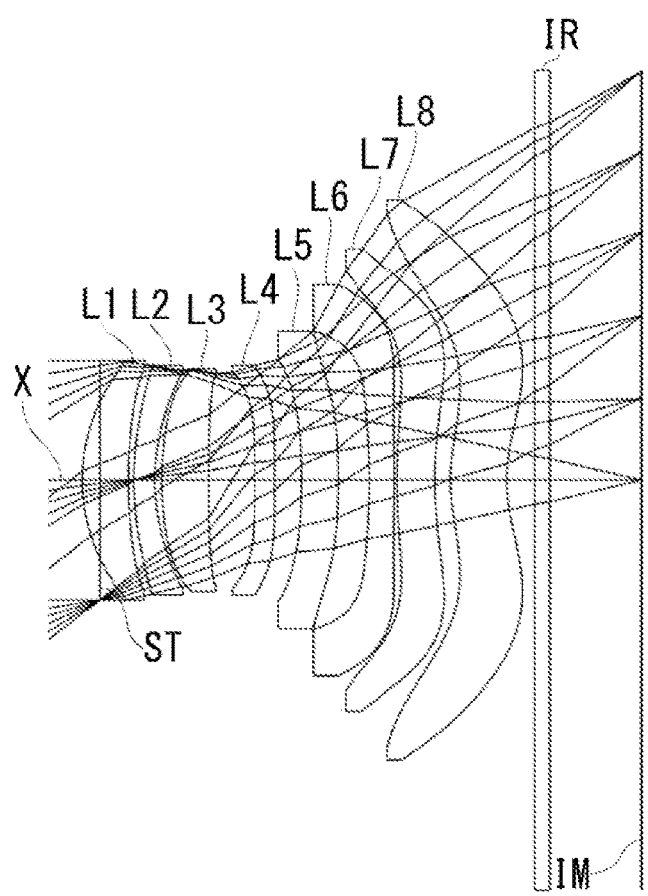
FIG. 11 is a sectional view illustrating a schematic configuration of an imaging lens according to Example 6 of the present invention.

As illustrated in FIG. 10, the imaging lens according to Example 5 is also capable of satisfactorily correcting the aberrations.

EXAMPLE 6

The basic lens data is shown below.

TABLE 11

Example 6

Unit mm f = 7.425
Fno = 2.19
ω(°) = 38.0
h = 5.8
TTL = 7.84

Surface Data

| i | r | d | nd | vd | |
|---|---|---|---|---|---|
| (Object) | Infinity | Infinity | | | |
| 1 (Stop) | Infinity | −0.250 | | | |
| 2* | 2.561 | 0.654 | 1.544 | 56.44 | (vd1) |
| 3* | 7.226 | 0.074 | | | |
| 4* | 3.896 | 0.295 | 1.671 | 19.24 | (vd2) |
| 5* | 2.784 | 0.103 | | | |
| 6* | 5.506 | 0.659 | 1.544 | 56.44 | (vd3) |

TABLE 11-continued

Example 6

| i | r | d | nd | vd | |
|---|---|---|---|---|---|
| 7* | 25.599 | 0.651 | | | |
| 8* | −101.878 | 0.279 | 1.544 | 56.44 | (vd4) |
| 9* | 40.246 | 0.387 | | | |
| 10* | −13.810 | 0.521 | 1.671 | 19.24 | (vd5) |
| 11* | −12.346 | 0.440 | | | |
| 12* | −7.225 | 0.350 | 1.535 | 55.69 | (vd6) |
| 13* | −24.223 | 0.038 | | | |
| 14* | 7.743 | 0.536 | 1.535 | 55.69 | (vd7) |
| 15* | 6.525 | 0.219 | | | |
| 16* | 2.571 | 0.792 | 1.535 | 55.69 | (vd8) |
| 17* | 2.107 | 0.400 | | | |
| 18 | Infinity | 0.210 | 1.517 | 64.20 | |
| 19 | Infinity | 1.300 | | | |
| Image Plane | | | | | |

ConstituentLens Data

| Lens | StartSurface | FocalLength | TotalTrack/DiagonalRatio |
|---|---|---|---|
| L1 | 2 | 6.941 | 0.68 |
| L2 | 4 | −16.275 | |
| L3 | 6 | 12.736 | |
| L4 | 8 | −52.952 | |
| L5 | 10 | 151.939 | |
| L6 | 12 | −19.390 | |
| L7 | 14 | −91.617 | |
| L8 | 16 | −53.888 | |

TABLE 12

Aspheric Surface Data

| | 2nd Surface | 3rd Surface | 4th Surface | 5th Surface | 6th Surface | 7th Surface |
|---|---|---|---|---|---|---|
| k | −7.936548E−01 | 0.000000E+00 | −1.164294E+00 | −3.494259E+00 | 0.000000E+00 | 0.000000E+00 |
| A4 | 2.683048E−03 | −2.241622E−02 | −4.533981E−02 | −5.012628E−03 | 2.182500E−02 | −4.277061E−03 |
| A6 | 4.772636E−03 | 4.616475E−02 | 5.211952E−02 | 1.596016E−02 | −1.639283E−02 | 2.872402E−02 |
| A8 | −1.077932E−04 | −3.557404E−02 | −4.239044E−02 | −3.361908E−02 | 3.069640E−02 | −5.750362E−02 |
| A10 | −6.515038E−03 | 8.881206E−03 | 1.405347E−02 | 5.840876E−02 | −2.185321E−02 | 7.218803E−02 |
| A12 | 8.255614E−03 | 8.250355E−03 | 6.571925E−03 | −6.362194E−02 | 3.288918E−03 | −5.143127E−02 |
| A14 | −4.949263E−03 | −8.513377E−03 | −8.382752E−03 | 4.274691E−02 | 6.562625E−03 | 1.908589E−02 |
| A16 | 1.612438E−03 | 3.501667E−03 | 3.498618E−03 | −1.699053E−02 | −4.804096E−03 | −2.151859E−03 |
| A18 | −2.738119E−04 | −7.277389E−04 | −7.032876E−04 | 3.633041E−03 | 1.311665E−03 | −6.573147E−04 |
| A20 | 1.860264E−05 | 6.189887E−05 | 5.671023E−05 | −3.219280E−04 | −1.291016E−04 | 1.637549E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | −3.645631E+02 | −3.159826E+02 | −8.339333E+00 | −3.601929E+01 |
| A4 | −4.428547E−02 | −5.276128E−02 | −7.093402E−02 | −6.938724E−02 | 2.469742E−02 | 8.608807E−04 |
| A6 | 2.351907E−03 | 1.170745E−02 | 4.157516E−02 | 4.961166E−02 | 7.022930E−02 | 1.599218E−02 |
| A8 | −1.191259E−02 | −8.354675E−03 | −1.874316E−02 | −2.654795E−02 | −1.356951E−02 | −1.001951E−02 |
| A10 | 1.446723E−02 | −6.795268E−03 | −9.993748E−04 | 4.942628E−03 | 7.935928E−03 | 2.418129E−03 |
| A12 | −9.452379E−03 | 1.900136E−02 | 7.012824E−03 | 3.374426E−03 | −2.660061E−03 | −2.284023E−04 |
| A14 | 1.141127E−03 | −1.667581E−02 | −4.000665E−03 | −2.486717E−03 | 5.717765E−04 | −1.644290E−05 |
| A16 | 2.093199E−03 | 7.498855E−03 | 1.007465E−03 | 6.955847E−04 | −8.086573E−05 | 6.109554E−06 |
| A18 | −1.168624E−03 | −1.742301E−03 | −1.033613E−04 | −9.304242E−05 | 6.718821E−06 | −5.528661E−07 |
| A20 | 1.913841E−04 | 1.674958E−04 | 7.641013E−07 | 4.909429E−06 | −2.790282E−07 | 1.755462E−08 |

| | 14th Surface | 15th Surface | 16th Surface | 17th Surface |
|---|---|---|---|---|
| k | 5.432032E−01 | 1.525450E−01 | −1.162438E+00 | −4.871281E+00 |
| A4 | −2.374051E−02 | −2.629906E−03 | −1.023485E−01 | −5.272418E−02 |
| A6 | 1.012759E−02 | −2.080741E−03 | 3.079195E−02 | 1.285932E−02 |
| A8 | −6.597942E−03 | −1.540866E−03 | −7.603584E−03 | −2.666880E−03 |
| A10 | 2.218897E−03 | 7.343338E−04 | 1.256642E−03 | 3.707189E−04 |
| A12 | −4.584821E−04 | −1.543681E−04 | −1.310155E−04 | −3.272549E−05 |
| A14 | 5.899349E−05 | 1.813680E−05 | 8.551019E−06 | 1.818610E−06 |
| A16 | −4.487540E−06 | −1.208914E−06 | −3.398237E−07 | −6.209403E−08 |
| A18 | 1.835354E−07 | 4.267867E−08 | 7.546098E−09 | 1.196320E−09 |
| A20 | −3.154324E−09 | −6.194523E−10 | −7.225294E−11 | −9.897681E−12 |

Figure 12:
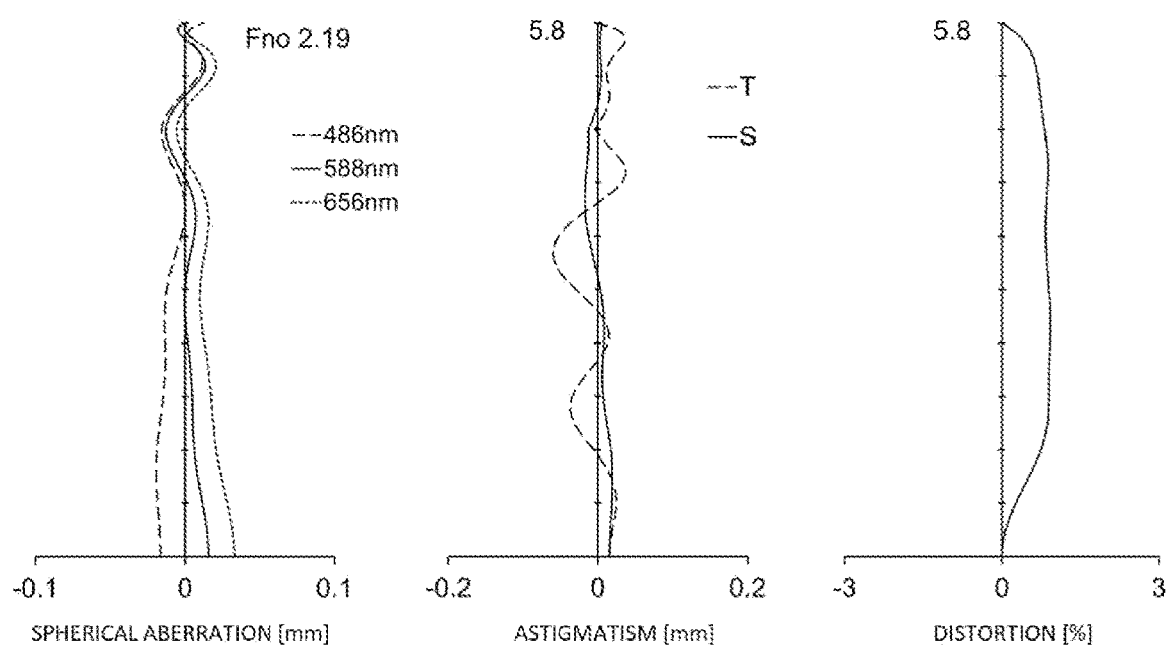
FIG. 12 is an aberration diagram illustrating spherical aberration, astigmatism, and distortion of the imaging lens in FIG. 11.
Figure 13:
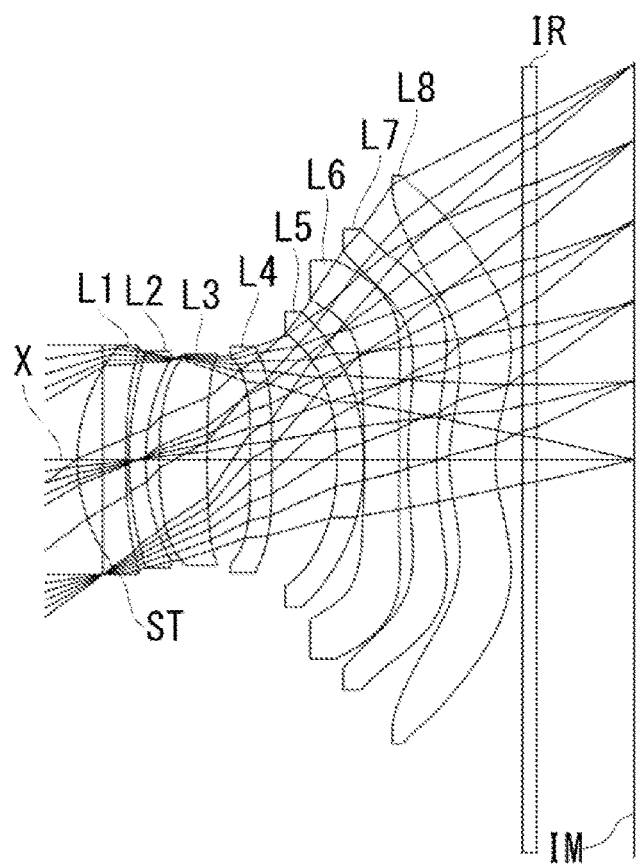
FIG. 13 is a sectional view illustrating a schematic configuration of an imaging lens according to Example 7 of the present invention.

As illustrated in FIG. 12, the imaging lens according to Example 6 is also capable of satisfactorily correcting the aberrations.

EXAMPLE 7

The basic lens data is shown below.

TABLE 13

Example 7

Unit mm $f = 7.756$
$Fno = 2.29$
$\omega(°) = 36.8$
$h = 5.8$
$TTL = 8.14$

Surface Data

| i | r | d | nd | vd | |
|---|---|---|---|---|---|
| (Object) | Infinity | Infinity | | | |
| 1 (Stop) | Infinity | −0.373 | | | |
| 2* | 2.596 | 0.714 | 1.544 | 56.44 | (vd1) |
| 3* | 8.794 | 0.043 | | | |
| 4* | 3.966 | 0.245 | 1.671 | 19.24 | (vd2) |
| 5* | 2.857 | 0.200 | | | |
| 6* | 6.428 | 0.702 | 1.544 | 56.44 | (vd3) |

TABLE 13-continued

Example 7

| | | | | | |
|---|---|---|---|---|---|
| 7* | 15.854 | 0.639 | | | |
| 8* | 192.070 | 0.314 | 1.544 | 56.44 | (vd4) |
| 9* | 74.077 | 0.973 | | | |
| 10* | −4.697 | 0.388 | 1.671 | 19.24 | (vd5) |
| 11* | −4.726 | 0.020 | | | |
| 12* | −8.944 | 0.508 | 1.535 | 55.69 | (vd6) |
| 13* | −56.465 | 0.128 | | | |
| 14* | 6.934 | 0.420 | 1.535 | 55.69 | (vd7) |
| 15* | 5.929 | 0.186 | | | |
| 16* | 2.432 | 0.675 | 1.535 | 55.69 | (vd8) |
| 17* | 2.092 | 0.400 | | | |
| 18 | Infinity | 0.210 | 1.517 | 64.20 | |
| 19 | Infinity | 1.443 | | | |
| Image Plane | | | | | |

Constituent Lens Data

| Lens | Start Surface | Focal Length | Total Track/ Diagonal Ratio |
|---|---|---|---|
| L1 | 2 | 6.501 | 0.71 |
| L2 | 4 | −16.706 | |
| L3 | 6 | 19.352 | |
| L4 | 8 | −221.685 | |
| L5 | 10 | 260.466 | |
| L6 | 12 | −19.945 | |
| L7 | 14 | −89.592 | |
| L8 | 16 | −90.915 | |

TABLE 14

Aspheric Surface Data

| | 2nd Surface | 3rd Surface | 4th Surface | 5th Surface | 6th Surface | 7th Surface |
|---|---|---|---|---|---|---|
| k | −7.658045E−01 | 0.000000E+00 | −1.201557E+00 | −3.315639E+00 | 0.000000E+00 | 0.000000E+00 |
| A4 | 2.353069E−03 | −2.288233E−02 | −4.567659E−02 | −5.749449E−03 | 2.222567E−02 | −4.051500E−03 |
| A6 | 4.767103E−03 | 4.624566E−02 | 5.222547E−02 | 1.629331E−02 | −1.551785E−02 | 2.875390E−02 |
| A8 | −9.197408E−05 | −3.553739E−02 | −4.233673E−02 | −3.349957E−02 | 3.067279E−02 | −5.724514E−02 |
| A10 | −6.514064E−03 | 8.881574E−03 | 1.407241E−02 | 5.846854E−02 | −2.196693E−02 | 7.227788E−02 |
| A12 | 8.259139E−03 | 8.251944E−03 | 6.574768E−03 | −6.361120E−02 | 3.283271E−03 | −5.140536E−02 |
| A14 | −4.947162E−03 | −8.520976E−03 | −8.384777E−03 | 4.274508E−02 | 6.577907E−03 | 1.910179E−02 |
| A16 | 1.613144E−03 | 3.502234E−03 | 3.497582E−03 | −1.699231E−02 | −4.798606E−03 | −2.144599E−03 |
| A18 | −2.745124E−04 | −7.270678E−04 | −7.031838E−04 | 3.632925E−03 | 1.312491E−03 | −6.645505E−04 |
| A20 | 1.870825E−05 | 6.169739E−05 | 5.652595E−05 | −3.220763E−04 | −1.306269E−04 | 1.638799E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.512320E−02 | −4.074083E−02 | −6.748687E−02 | −6.629020E−02 | 3.044903E−02 | −1.593610E−03 |
| A6 | 3.599379E−03 | 1.079819E−02 | 4.211959E−02 | 4.879809E−02 | −2.897480E−04 | 1.595515E−02 |
| A8 | −1.186345E−02 | −8.556620E−03 | −1.868771E−02 | −2.652863E−02 | −1.326537E−02 | −9.891644E−03 |
| A10 | 1.428526E−02 | −6.724570E−03 | −9.491581E−04 | 4.903957E−03 | 8.010084E−03 | 2.415007E−03 |
| A12 | −9.405853E−03 | 1.905919E−02 | 6.937629E−03 | 3.376671E−03 | −2.662027E−03 | −2.291620E−04 |
| A14 | 1.197627E−03 | −1.665003E−02 | −4.007217E−03 | −2.487819E−03 | 5.705887E−04 | −1.646287E−05 |
| A16 | 2.117812E−03 | 7.492959E−03 | 1.008318E−03 | 6.952693E−04 | −8.141454E−05 | 6.110629E−06 |
| A18 | −1.165998E−03 | −1.747217E−03 | −1.028962E−04 | −9.298546E−05 | 6.862196E−06 | −5.527009E−07 |
| A20 | 1.843871E−04 | 1.673737E−04 | 1.224075E−06 | 4.921892E−06 | −2.415309E−07 | 1.762356E−08 |

| | 14th Surface | 15th Surface | 16th Surface | 17th Surface |
|---|---|---|---|---|
| k | 1.630952E−01 | 0.000000E+00 | −1.173598E+00 | −4.640814E+00 |
| A4 | −2.474052E−02 | −3.511985E−03 | −1.024218E−01 | −5.260800E−02 |
| A6 | 1.013554E−02 | −2.096549E−03 | 3.080652E−02 | 1.290854E−02 |
| A8 | −6.615503E−03 | −1.536760E−03 | −7.602873E−03 | −2.665275E−03 |
| A10 | 2.217667E−03 | 7.343930E−04 | 1.256609E−03 | 3.708329E−04 |
| A12 | −4.585907E−04 | −1.543936E−04 | −1.310203E−04 | −3.272539E−05 |
| A14 | 5.898648E−05 | 1.813877E−05 | 8.550543E−06 | 1.818382E−06 |
| A16 | −4.487803E−06 | −1.208873E−06 | −3.398532E−07 | −6.211105E−08 |
| A18 | 1.837032E−07 | 4.267634E−08 | 7.546170E−09 | 1.195999E−09 |
| A20 | −3.126008E−09 | −6.194083E−10 | −7.202225E−11 | −9.871533E−12 |

Figure 14:
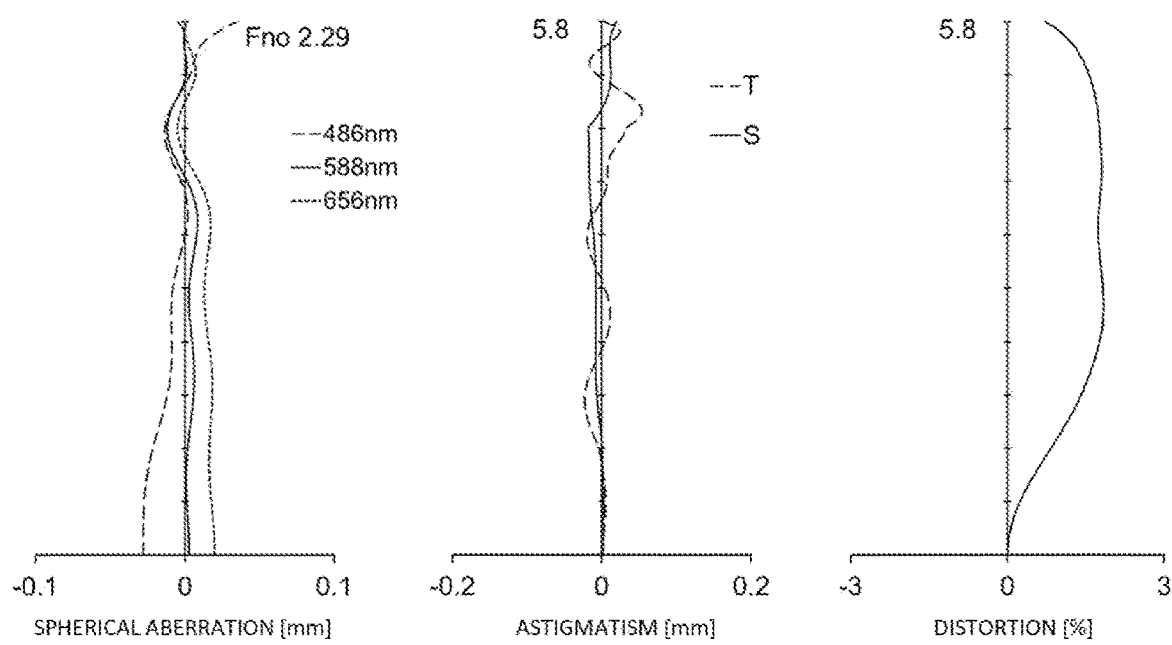
FIG. 14 is an aberration diagram illustrating spherical aberration, astigmatism, and distortion of the imaging lens in FIG. 13.
Figure 15:
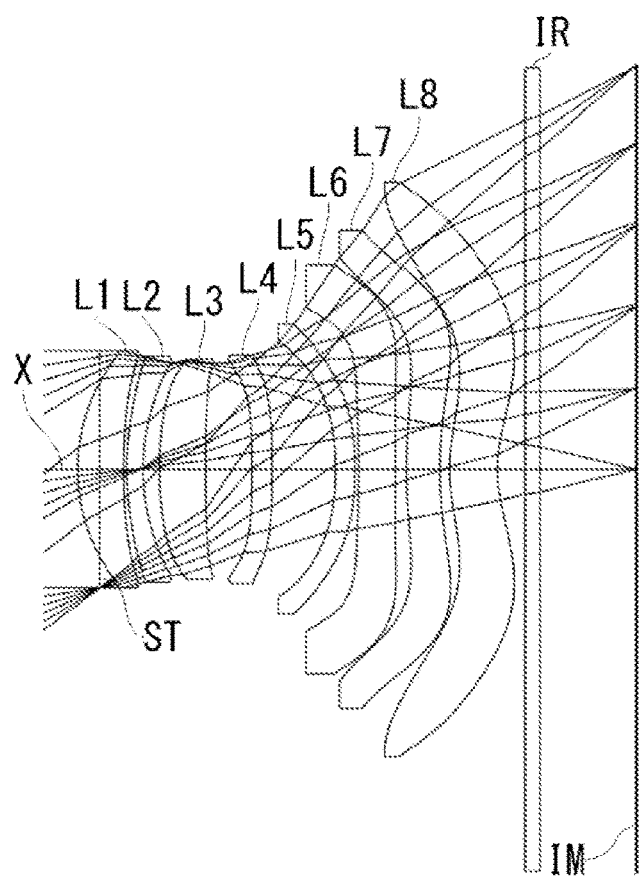
FIG. 15 is a sectional view illustrating a schematic configuration of an imaging lens according to Example 8 of the present invention.

As illustrated in FIG. 14, the imaging lens according to Example 7 is also capable of satisfactorily correcting the aberrations.

EXAMPLE 8

The basic lens data is shown below.

TABLE 15

Example 8

Unit mm f = 7.575
Fno = 2.22
ω(°) = 37.4
h = 5.8
TTL = 7.99

Surface Data

| i | r | d | nd | vd | |
|---|---|---|---|---|---|
| (Object) | Infinity | Infinity | | | |
| 1 (Stop) | Infinity | −0.318 | | | |
| 2* | 2.626 | 0.661 | 1.544 | 56.44 | (vd1) |
| 3* | 7.700 | 0.045 | | | |
| 4* | 3.865 | 0.235 | 1.671 | 19.24 | (vd2) |
| 5* | 2.827 | 0.240 | | | |
| 6* | 6.055 | 0.664 | 1.544 | 56.44 | (vd3) |

TABLE 15-continued

Example 8

| | | | | | |
|---|---|---|---|---|---|
| 7* | 25.932 | 0.664 | | | |
| 8* | −33.767 | 0.287 | 1.544 | 56.44 | (vd4) |
| 9* | −43.134 | 0.925 | | | |
| 10* | −4.531 | 0.282 | 1.671 | 19.24 | (vd5) |
| 11* | −4.863 | 0.053 | | | |
| 12* | −10.640 | 0.528 | 1.535 | 55.69 | (vd6) |
| 13* | −59.985 | 0.159 | | | |
| 14* | 6.760 | 0.482 | 1.535 | 55.69 | (vd7) |
| 15* | 5.857 | 0.137 | | | |
| 16* | 2.471 | 0.689 | 1.535 | 55.69 | (vd8) |
| 17* | 2.032 | 0.400 | | | |
| 18 | Infinity | 0.210 | 1.517 | 64.20 | |
| 19 | Infinity | 1.397 | | | |
| Image Plane | | | | | |

Constituent Lens Data

| Lens | StartSurface | FocalLength | TotalTrack/DiagonalRatio |
|---|---|---|---|
| L1 | 2 | 7.000 | 0.69 |
| L2 | 4 | −17.272 | |
| L3 | 6 | 14.341 | |
| L4 | 8 | −288.713 | |
| L5 | 10 | −150.251 | |
| L6 | 12 | −24.274 | |
| L7 | 14 | −100.763 | |
| L8 | 16 | −47.159 | |

TABLE 16

Aspheric Surface Data

| | 2nd Surface | 3rd Surface | 4th Surface | 5th Surface | 6th Surface | 7th Surface |
|---|---|---|---|---|---|---|
| k | −7.894798E−01 | 0.000000E+00 | −1.130651E+00 | −3.321557E+00 | 0.000000E+00 | 0.000000E+00 |
| A4 | 2.187424E−03 | −2.257754E−02 | −4.569648E−02 | −5.721946E−03 | 2.139882E−02 | −5.495915E−03 |
| A6 | 4.836847E−03 | 4.627302E−02 | 5.229756E−02 | 1.612170E−02 | −1.649505E−02 | 2.807159E−02 |
| A8 | −1.016307E−04 | −3.555768E−02 | −4.233699E−02 | −3.353139E−02 | 3.057094E−02 | −5.748246E−02 |
| A10 | −6.514145E−03 | 8.868180E−03 | 1.406286E−02 | 5.845300E−02 | −2.190177E−02 | 7.225053E−02 |
| A12 | 8.256604E−03 | 8.247677E−03 | 6.570603E−03 | −6.361040E−02 | 3.291001E−03 | −5.137620E−02 |
| A14 | −4.948544E−03 | −8.521359E−03 | −8.385067E−03 | 4.274878E−02 | 6.578589E−03 | 1.909750E−02 |
| A16 | 1.612745E−03 | 3.502239E−03 | 3.498121E−03 | −1.699102E−02 | −4.797860E−03 | −2.156879E−03 |
| A18 | −2.745124E−04 | −7.270678E−04 | −7.031838E−04 | 3.632925E−03 | 1.312491E−03 | −6.645505E−04 |
| A20 | 1.869606E−05 | 6.176401E−05 | 5.677106E−05 | −3.216324E−04 | −1.304998E−04 | 1.653595E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.607110E−02 | −4.333226E−02 | −7.413701E−02 | −7.083220E−02 | 3.044451E−02 | −1.857094E−03 |
| A6 | 2.984651E−03 | 1.066593E−02 | 4.251289E−02 | 4.851381E−02 | −6.473490E−02 | 1.617743E−02 |
| A8 | −1.158149E−02 | −8.484502E−03 | −1.869165E−02 | −2.652446E−02 | −1.326786E−02 | −9.973522E−03 |
| A10 | 1.430794E−02 | −6.694821E−03 | −1.115631E−03 | 4.898533E−03 | 8.012377E−03 | 2.421921E−03 |
| A12 | −9.411554E−03 | 1.906652E−02 | 6.980483E−03 | 3.375055E−03 | −2.662125E−03 | −2.288408E−04 |
| A14 | 1.199273E−03 | −1.664668E−02 | −4.007749E−03 | −2.487609E−03 | 5.704404E−04 | −1.647119E−05 |
| A16 | 2.121981E−03 | 7.495849E−03 | 1.007859E−03 | 6.954686E−04 | −8.132845E−05 | 6.105713E−06 |
| A18 | −1.165998E−03 | −1.747217E−03 | −1.028962E−04 | −9.298546E−05 | 6.862196E−06 | −5.527009E−07 |
| A20 | 1.851254E−04 | 1.676287E−04 | 1.148430E−06 | 4.929084E−06 | −2.428144E−07 | 1.767464E−08 |

| | 14th Surface | 15th Surface | 16th Surface | 17th Surface |
|---|---|---|---|---|
| k | −1.655375E−01 | 0.000000E+00 | −1.185903E+00 | −4.688516E+00 |
| A4 | −2.558509E−02 | −2.872437E−03 | −1.025527E−01 | −5.195292E−02 |
| A6 | 1.006031E−02 | −2.114256E−03 | 3.080702E−02 | 1.290140E−02 |
| A8 | −6.607526E−03 | −1.539477E−03 | −7.603152E−03 | −2.665344E−03 |
| A10 | 2.217446E−03 | 7.344383E−04 | 1.256615E−03 | 3.707328E−04 |
| A12 | −4.585846E−04 | −1.543798E−04 | −1.310195E−04 | −3.272975E−05 |
| A14 | 5.898945E−05 | 1.813688E−05 | 8.550576E−06 | 1.818428E−06 |
| A16 | −4.487324E−06 | −1.208834E−06 | −3.398538E−07 | −6.210307E−08 |
| A18 | 1.837032E−07 | 4.267634E−08 | 7.546170E−09 | 1.195999E−09 |
| A20 | −3.124579E−09 | −6.193678E−10 | −7.203295E−11 | −9.903240E−12 |

Figure 16:
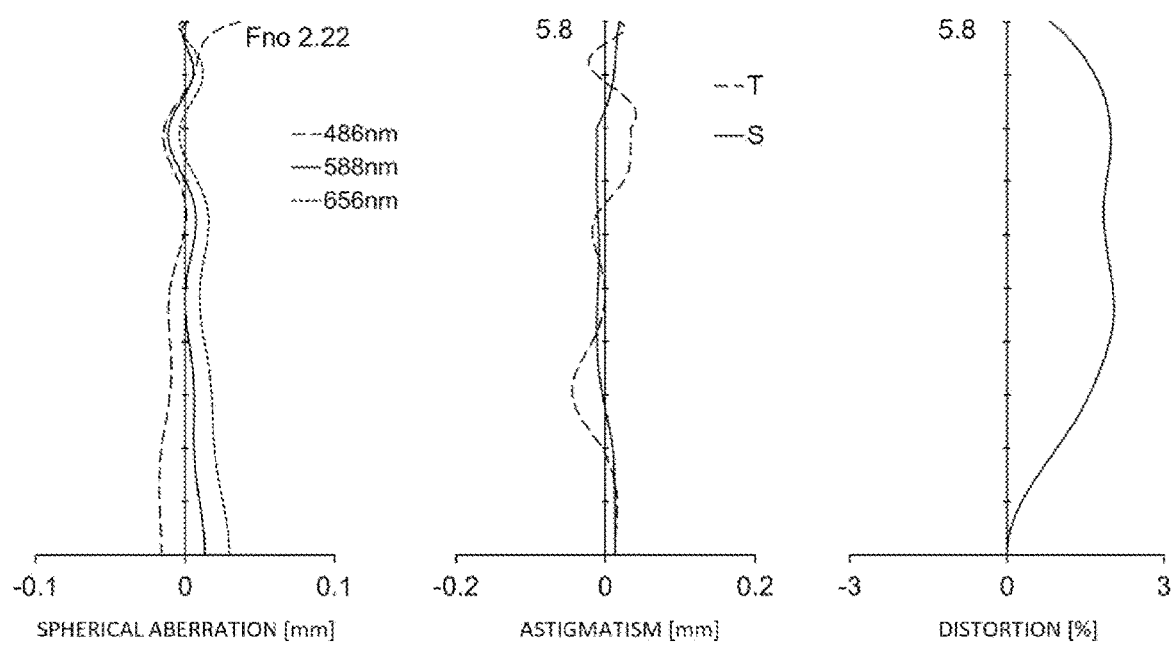
FIG. 16 is an aberration diagram illustrating spherical aberration, astigmatism, and distortion of the imaging lens in FIG. 15.
Figure 17:
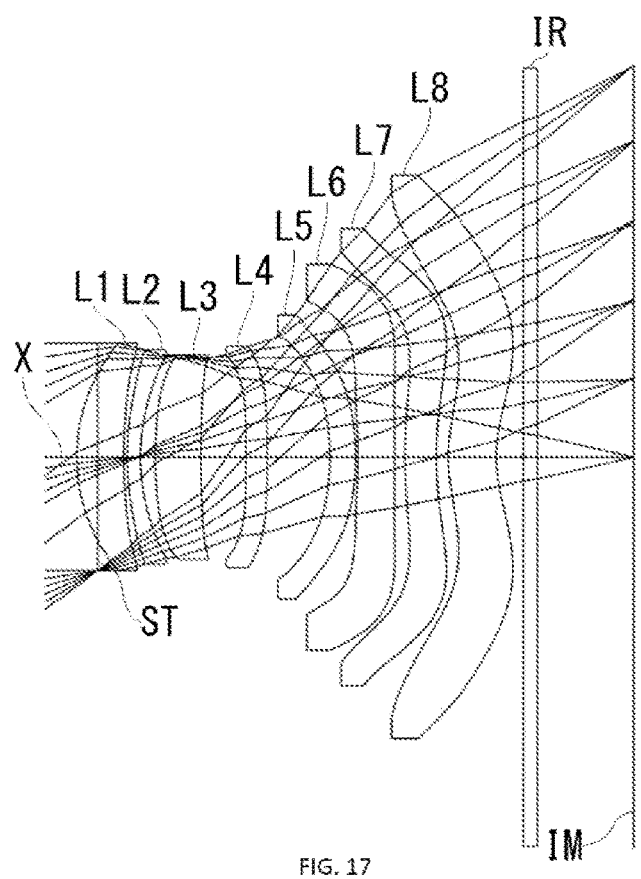
FIG. 17 is a sectional view illustrating a schematic configuration of an imaging lens according to Example 9 of the present invention.

As illustrated in FIG. 16, the imaging lens according to Example 8 is also capable of satisfactorily correcting the aberrations.

EXAMPLE 9

The basic lens data is shown below.

TABLE 17

Example 9

Unit mm f = 7.760
Fno = 2.29
ω(°) = 36.8
h = 5.8
TTL = 8.23

Surface Data

| i | r | d | nd | vd | |
|---|---|---|---|---|---|
| (Object) | Infinity | Infinity | | | |
| 1 (Stop) | Infinity | −0.309 | | | |
| 2* | 2.593 | 0.703 | 1.544 | 56.44 | (vd1) |
| 3* | 8.420 | 0.047 | | | |
| 4* | 3.846 | 0.196 | 1.671 | 19.24 | (vd2) |
| 5* | 2.855 | 0.223 | | | |
| 6* | 6.842 | 0.680 | 1.544 | 56.44 | (vd3) |

TABLE 17-continued

Example 9

| i | r | d | nd | vd | |
|---|---|---|---|---|---|
| 7* | 18.770 | 0.667 | | | |
| 8* | −134.649 | 0.310 | 1.544 | 56.44 | (vd4) |
| 9* | 248.250 | 0.945 | | | |
| 10* | −4.544 | 0.381 | 1.671 | 19.24 | (vd5) |
| 11* | −4.815 | 0.031 | | | |
| 12* | −9.971 | 0.554 | 1.535 | 55.69 | (vd6) |
| 13* | −48.490 | 0.150 | | | |
| 14* | 6.719 | 0.471 | 1.535 | 55.69 | (vd7) |
| 15* | 5.977 | 0.173 | | | |
| 16* | 2.427 | 0.714 | 1.535 | 55.69 | (vd8) |
| 17* | 2.050 | 0.400 | | | |
| 18 | Infinity | 0.210 | 1.517 | 64.20 | |
| 19 | Infinity | 1.444 | | | |
| Image Plane | | | | | |

Constituent Lens Data

| Lens | StartSurface | FocalLength | TotalTrack/DiagonalRatio |
|---|---|---|---|
| L1 | 2 | 6.601 | 0.71 |
| L2 | 4 | −17.945 | |
| L3 | 6 | 19.385 | |
| L4 | 8 | −160.297 | |
| L5 | 10 | −274.684 | |
| L6 | 12 | −23.590 | |
| L7 | 14 | −129.925 | |
| L8 | 16 | −72.567 | |

TABLE 18

Aspheric Surface Data

| | 2nd Surface | 3rd Surface | 4th Surface | 5th Surface | 6th Surface | 7th Surface |
|---|---|---|---|---|---|---|
| k | −7.808466E−01 | 0.000000E+00 | −1.149231E+00 | −3.284993E+00 | 0.000000E+00 | 0.000000E+00 |
| A4 | 2.268785E−03 | −2.263194E−02 | −4.572512E−02 | −5.656326E−03 | 2.142045E−02 | −5.420061E−03 |
| A6 | 4.865440E−03 | 4.623581E−02 | 5.230299E−02 | 1.612680E−02 | −1.647028E−02 | 2.817144E−02 |
| A8 | −9.207060E−05 | −3.556409E−02 | −4.233979E−02 | −3.351617E−02 | 3.058059E−02 | −5.742781E−02 |
| A10 | −6.510174E−03 | 8.867481E−03 | 1.406070E−02 | 5.846410E−02 | −2.190456E−02 | 7.227364E−02 |
| A12 | 8.258374E−03 | 8.248093E−03 | 6.569889E−03 | −6.360551E−02 | 3.287302E−03 | −5.137278E−02 |
| A14 | −4.947868E−03 | −8.521107E−03 | −8.385122E−03 | 4.275037E−02 | 6.577392E−03 | 1.909878E−02 |
| A16 | 1.612984E−03 | 3.502395E−03 | 3.498130E−03 | −1.699065E−02 | −4.798226E−03 | −2.156538E−03 |
| A18 | −2.745124E−04 | −7.270678E−04 | −7.031838E−04 | 3.632925E−03 | 1.312491E−03 | −6.645505E−04 |
| A20 | 1.870803E−05 | 6.180953E−05 | 5.676387E−05 | −3.216349E−04 | −1.304009E−04 | 1.652672E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.630409E−02 | −4.329455E−02 | −7.385332E−02 | −7.037175E−02 | 3.119863E−02 | −2.239582E−03 |
| A6 | 2.882554E−03 | 1.063228E−02 | 4.286024E−02 | 4.857976E−02 | −3.511791E−02 | 1.617978E−02 |
| A8 | −1.157563E−02 | −8.545529E−03 | −1.869196E−02 | −2.651648E−02 | −1.328055E−02 | −9.970577E−03 |
| A10 | 1.431416E−02 | −6.731477E−03 | −1.123076E−03 | 4.900806E−03 | 8.009462E−03 | 2.420547E−03 |
| A12 | −9.420585E−03 | 1.905496E−02 | 6.981774E−03 | 3.375119E−03 | −2.662044E−03 | −2.290297E−04 |
| A14 | 1.192411E−03 | −1.664952E−02 | −4.007486E−03 | −2.487764E−03 | 5.704342E−04 | −1.648673E−05 |
| A16 | 2.123425E−03 | 7.494330E−03 | 1.007891E−03 | 6.954482E−04 | −8.133140E−05 | 6.104999E−06 |
| A18 | −1.165998E−03 | −1.747217E−03 | −1.028962E−04 | −9.298546E−05 | 6.862196E−06 | −5.527009E−07 |
| A20 | 1.852683E−04 | 1.672191E−04 | 1.137319E−06 | 4.928072E−06 | −2.434849E−07 | 1.769115E−08 |

| | 14th Surface | 15th Surface | 16th Surface | 17th Surface |
|---|---|---|---|---|
| k | −1.298987E−01 | 0.000000E+00 | −1.174751E+00 | −4.689865E+00 |
| A4 | −2.519423E−02 | −3.048836E−03 | −1.025133E−01 | −5.146822E−02 |
| A6 | 1.006183E−02 | −2.104169E−03 | 3.080708E−02 | 1.290951E−02 |
| A8 | −6.607845E−03 | −1.538836E−03 | −7.603074E−03 | −2.664862E−03 |
| A10 | 2.217346E−03 | 7.344968E−04 | 1.256614E−03 | 3.707613E−04 |
| A12 | −4.585924E−04 | −1.543752E−04 | −1.310194E−04 | −3.272818E−05 |
| A14 | 5.898871E−05 | 1.813698E−05 | 8.550587E−06 | 1.818433E−06 |
| A16 | −4.487312E−06 | −1.208818E−06 | −3.398518E−07 | −6.210170E−08 |
| A18 | 1.837032E−07 | 4.267634E−08 | 7.546170E−09 | 1.195999E−09 |
| A20 | −3.125685E−09 | −6.193604E−10 | −7.203090E−11 | −9.902963E−12 |

Figure 18:
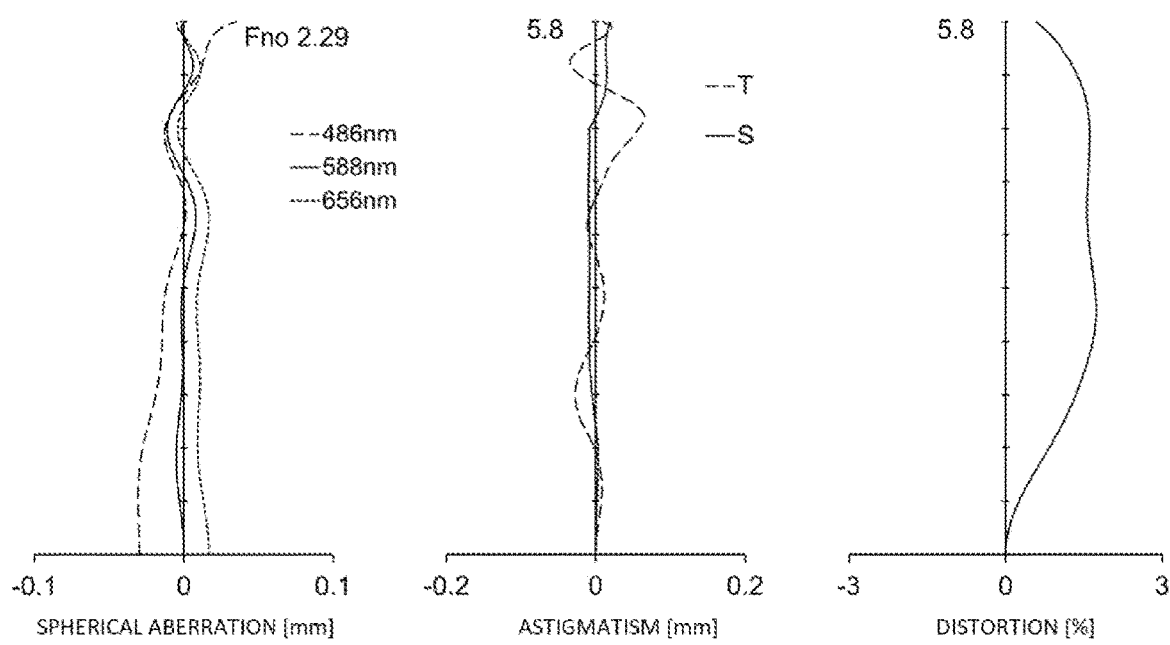
FIG. 18 is an aberration diagram illustrating spherical aberration, astigmatism, and distortion of the imaging lens in FIG. 17.
Figure 19:
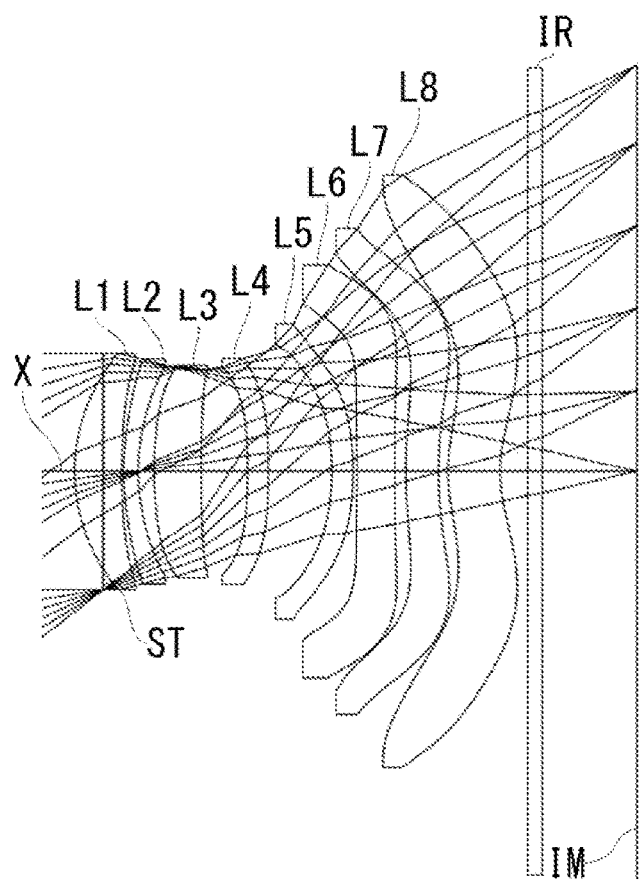
FIG. 19 is a sectional view illustrating a schematic configuration of an imaging lens according to Example 10 of the present invention.

As illustrated in FIG. 18, the imaging lens according to Example 9 is also capable of satisfactorily correcting the aberrations.

EXAMPLE 10

The basic lens data is shown below.

TABLE 19

Example 10

Unit mm f = 7.517
Fno = 2.21
ω(°) = 37.7
h = 5.8
TTL = 8.00

Surface Data

| i | r | d | nd | vd | |
|---|---|---|---|---|---|
| (Object) | Infinity | Infinity | | | |
| 1 (Stop) | Infinity | −0.411 | | | |
| 2* | 2.596 | 0.674 | 1.544 | 56.44 | (vd1) |
| 3* | 8.138 | 0.029 | | | |
| 4* | 3.814 | 0.208 | 1.671 | 19.24 | (vd2) |
| 5* | 2.850 | 0.231 | | | |
| 6* | 6.565 | 0.674 | 1.544 | 56.44 | (vd3) |

TABLE 19-continued

Example 10

| | | | | | |
|---|---|---|---|---|---|
| 7* | 22.636 | 0.665 | | | |
| 8* | −11.425 | 0.297 | 1.544 | 56.44 | (vd4) |
| 9* | −12.891 | 0.914 | | | |
| 10* | −4.518 | 0.308 | 1.671 | 19.24 | (vd5) |
| 11* | −4.982 | 0.059 | | | |
| 12* | −13.974 | 0.539 | 1.535 | 55.69 | (vd6) |
| 13* | −761.323 | 0.157 | | | |
| 14* | 6.682 | 0.469 | 1.535 | 55.69 | (vd7) |
| 15* | 5.757 | 0.136 | | | |
| 16* | 2.450 | 0.748 | 1.535 | 55.69 | (vd8) |
| 17* | 2.030 | 0.400 | | | |
| 18 | Infinity | 0.210 | 1.517 | 64.20 | |
| 19 | Infinity | 1.357 | | | |
| Image Plane | | | | | |

Constituent Lens Data

| Lens | StartSurface | FocalLength | TotalTrack/DiagonalRatio |
|---|---|---|---|
| L1 | 2 | 6.715 | 0.69 |
| L2 | 4 | −18.402 | |
| L3 | 6 | 16.737 | |
| L4 | 8 | −198.711 | |
| L5 | 10 | −98.652 | |
| L6 | 12 | −26.624 | |
| L7 | 14 | −94.372 | |
| L8 | 16 | −58.043 | |

TABLE 20

Aspheric Surface Data

| | 2nd Surface | 3rd Surface | 4th Surface | 5th Surface | 6th Surface | 7th Surface |
|---|---|---|---|---|---|---|
| k | −7.800788E−01 | 0.000000E+00 | −1.134256E+00 | −3.302852E+00 | 0.000000E+00 | 0.000000E+00 |
| A4 | 2.259756E−03 | −2.263685E−02 | −4.570544E−02 | −5.685774E−03 | 2.137209E−02 | −5.338864E−03 |
| A6 | 4.859210E−03 | 4.625199E−02 | 5.229753E−02 | 1.611965E−02 | −1.648016E−02 | 2.807761E−02 |
| A8 | −9.714802E−05 | −3.556105E−02 | −4.233803E−02 | −3.352994E−02 | 3.059067E−02 | −5.750241E−02 |
| A10 | −6.513686E−03 | 8.867962E−03 | 1.406180E−02 | 5.845593E−02 | −2.189355E−02 | 7.224604E−02 |
| A12 | 8.256606E−03 | 8.248098E−03 | 6.570036E−03 | −6.360897E−02 | 3.292229E−03 | −5.137687E−02 |
| A14 | −4.948526E−03 | −8.521161E−03 | −8.385051E−03 | 4.274939E−02 | 6.579173E−03 | 1.909982E−02 |
| A16 | 1.612779E−03 | 3.502330E−03 | 3.498186E−03 | −1.699089E−02 | −4.797610E−03 | −2.155563E−03 |
| A18 | −2.745124E−04 | −7.270678E−04 | −7.031838E−04 | 3.632925E−03 | 1.312491E−03 | −6.645505E−04 |
| A20 | 1.870537E−05 | 6.179637E−05 | 5.678058E−05 | −3.216590E−04 | −1.303663E−04 | 1.654653E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.620531E−02 | −4.333603E−02 | −7.382797E−02 | −7.078231E−02 | 3.063638E−02 | −1.950597E−03 |
| A6 | 2.818861E−03 | 1.079328E−02 | 4.278367E−02 | 4.848025E−02 | −6.363666E−02 | 1.615116E−02 |
| A8 | −1.165516E−02 | −8.425565E−03 | −1.867729E−02 | −2.652695E−02 | −1.327707E−02 | −9.980600E−03 |
| A10 | 1.429689E−02 | −6.693529E−03 | −1.116712E−03 | 4.900903E−03 | 8.014763E−03 | 2.421006E−03 |
| A12 | −9.408840E−03 | 1.906165E−02 | 6.981011E−03 | 3.375711E−03 | −2.661611E−03 | −2.289203E−04 |
| A14 | 1.201335E−03 | −1.664916E−02 | −4.007819E−03 | −2.487501E−03 | 5.704656E−04 | −1.647562E−05 |
| A16 | 2.129113E−03 | 7.494122E−03 | 1.007819E−03 | 6.955266E−04 | −8.133317E−05 | 6.105786E−06 |
| A18 | −1.165998E−03 | −1.747217E−03 | −1.028962E−04 | −9.298546E−05 | 6.862196E−06 | −5.527009E−07 |
| A20 | 1.841889E−04 | 1.674656E−04 | 1.157849E−06 | 4.932900E−06 | −2.434321E−07 | 1.768444E−08 |

| | 14th Surface | 15th Surface | 16th Surface | 17th Surface |
|---|---|---|---|---|
| k | −2.314950E−01 | 0.000000E+00 | −1.186460E+00 | −4.662067E+00 |
| A4 | −2.546252E−02 | −2.977599E−03 | −1.025518E−01 | −5.165063E−02 |
| A6 | 1.005901E−02 | −2.116494E−03 | 3.080537E−02 | 1.290557E−02 |
| A8 | −6.607160E−03 | −1.539776E−03 | −7.603131E−03 | −2.664945E−03 |
| A10 | 2.217415E−03 | 7.344064E−04 | 1.256611E−03 | 3.707512E−04 |
| A12 | −4.585880E−04 | −1.543799E−04 | −1.310196E−04 | −3.272888E−05 |
| A14 | 5.898908E−05 | 1.813676E−05 | 8.550576E−06 | 1.818394E−06 |
| A16 | −4.487298E−06 | −1.208832E−06 | −3.398530E−07 | −6.210383E−08 |
| A18 | 1.837032E−07 | 4.267634E−08 | 7.546170E−09 | 1.195999E−09 |
| A20 | −3.125032E−09 | −6.194602E−10 | −7.203284E−11 | −9.907364E−12 |

Figure 20:
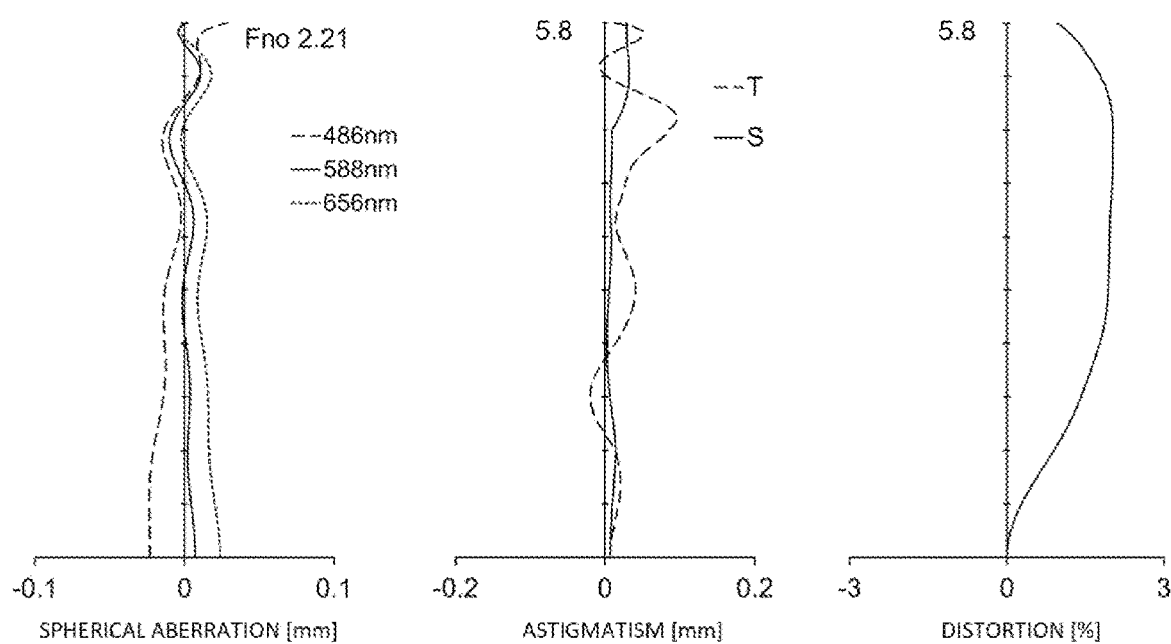
FIG. 20 is an aberration diagram illustrating spherical aberration, astigmatism, and distortion of the imaging lens in FIG. 19.
Figure 21:
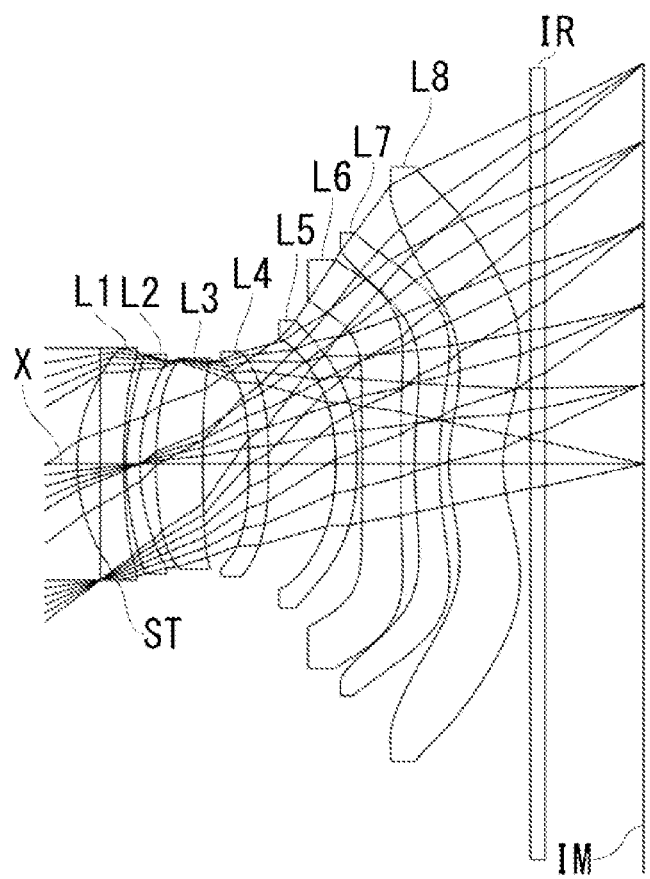
FIG. 21 is a sectional view illustrating a schematic configuration of an imaging lens according to Example 11 of the present invention.

As illustrated in FIG. 20, the imaging lens according to Example 10 is also capable of satisfactorily correcting the aberrations.

EXAMPLE 11

The basic lens data is shown below.

TABLE 21

Example 11

Unit mm $f = 7.758$
$Fno = 2.28$
$\omega(°) = 36.8$
$h = 5.8$
$TTL = 8.22$

Surface Data

| i | r | d | nd | vd | |
|---|---|---|---|---|---|
| (Object) | Infinity | Infinity | | | |
| 1 (Stop) | Infinity | −0.339 | | | |
| 2* | 2.636 | 0.683 | 1.544 | 56.44 | (vd1) |
| 3* | 8.305 | 0.034 | | | |
| 4* | 3.816 | 0.197 | 1.671 | 19.24 | (vd2) |
| 5* | 2.864 | 0.238 | | | |
| 6* | 6.762 | 0.682 | 1.544 | 56.44 | (vd3) |

TABLE 21-continued

Example 11

| | | | | | |
|---|---|---|---|---|---|
| 7* | 21.411 | 0.672 | | | |
| 8* | −10.505 | 0.290 | 1.544 | 56.44 | (vd4) |
| 9* | −11.801 | 0.980 | | | |
| 10* | −4.491 | 0.312 | 1.671 | 19.24 | (vd5) |
| 11* | −5.008 | 0.079 | | | |
| 12* | −17.985 | 0.570 | 1.567 | 37.40 | (vd6) |
| 13* | 98.631 | 0.204 | | | |
| 14* | 6.990 | 0.363 | 1.535 | 55.69 | (vd7) |
| 15* | 5.867 | 0.135 | | | |
| 16* | 2.413 | 0.793 | 1.535 | 55.69 | (vd8) |
| 17* | 2.052 | 0.400 | | | |
| 18 | Infinity | 0.210 | 1.517 | 64.20 | |
| 19 | Infinity | 1.446 | | | |
| Image Plane | | | | | |

Constituent Lens Data

| Lens | StartSurface | FocalLength | TotalTrack/DiagonalRatio |
|---|---|---|---|
| L1 | 2 | 6.802 | 0.71 |
| L2 | 4 | −18.676 | |
| L3 | 6 | 17.858 | |
| L4 | 8 | −190.733 | |
| L5 | 10 | −85.492 | |
| L6 | 12 | −26.772 | |
| L7 | 14 | −76.952 | |
| L8 | 16 | −109.306 | |

TABLE 22

Aspheric Surface Data

| | 2nd Surface | 3rd Surface | 4th Surface | 5th Surface | 6th Surface | 7th Surface |
|---|---|---|---|---|---|---|
| k | −7.775980E−01 | 0.000000E+00 | −1.147998E+00 | −3.298930E+00 | 0.000000E+00 | 0.000000E+00 |
| A4 | 2.185268E−03 | −2.265599E−02 | −4.578381E−02 | −5.677689E−03 | 2.140185E−02 | −5.313327E−03 |
| A6 | 4.865591E−03 | 4.624044E−02 | 5.229152E−02 | 1.613570E−02 | −1.646853E−02 | 2.814234E−02 |
| A8 | −9.590235E−05 | −3.556958E−02 | −4.233878E−02 | −3.352610E−02 | 3.059030E−02 | −5.746067E−02 |
| A10 | −6.512245E−03 | 8.866609E−03 | 1.406023E−02 | 5.845872E−02 | −2.189809E−02 | 7.225895E−02 |
| A12 | 8.256127E−03 | 8.247384E−03 | 6.570394E−03 | −6.360876E−02 | 3.290830E−03 | −5.136715E−02 |
| A14 | −4.948077E−03 | −8.521179E−03 | −8.384952E−03 | 4.274909E−02 | 6.578906E−03 | 1.910205E−02 |
| A16 | 1.612884E−03 | 3.502351E−03 | 3.498195E−03 | −1.699103E−02 | −4.797666E−03 | −2.151978E−03 |
| A18 | −2.745124E−04 | −7.270678E−04 | −7.031838E−04 | 3.632925E−03 | 1.312491E−03 | −6.645505E−04 |
| A20 | 1.870686E−05 | 6.180367E−05 | 5.677007E−05 | −3.216409E−04 | −1.303670E−04 | 1.655125E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.631178E−02 | −4.253547E−02 | −7.285437E−02 | −7.190494E−02 | 2.849765E−02 | −3.795298E−03 |
| A6 | 2.785551E−03 | 1.083307E−02 | 4.285243E−02 | 4.827327E−02 | −7.875861E−04 | 1.615638E−02 |
| A8 | −1.159757E−02 | −8.477206E−03 | −1.864586E−02 | −2.656713E−02 | −1.326968E−02 | −9.967868E−03 |
| A10 | 1.431949E−02 | −6.722340E−03 | −1.123352E−03 | 4.898994E−03 | 8.013854E−03 | 2.421752E−03 |
| A12 | −9.405884E−03 | 1.904733E−02 | 6.975934E−03 | 3.375874E−03 | −2.661735E−03 | −2.289035E−04 |
| A14 | 1.186187E−03 | −1.665407E−02 | −4.009112E−03 | −2.487436E−03 | 5.705346E−04 | −1.647659E−05 |
| A16 | 2.120648E−03 | 7.492883E−03 | 1.007687E−03 | 6.955415E−04 | −8.132144E−05 | 6.105560E−06 |
| A18 | −1.165998E−03 | −1.747217E−03 | −1.028962E−04 | −9.298546E−05 | 6.862196E−06 | −5.527009E−07 |
| A20 | 1.846752E−04 | 1.671788E−04 | 1.214730E−06 | 4.934077E−06 | −2.439501E−07 | 1.768615E−08 |

| | 14th Surface | 15th Surface | 16th Surface | 17th Surface |
|---|---|---|---|---|
| k | −1.598327E+00 | 0.000000E+00 | −1.175311E+00 | −4.539581E+00 |
| A4 | −2.564487E−02 | −3.675565E−03 | −1.025329E−01 | −5.188153E−02 |
| A6 | 1.004585E−02 | −2.180422E−03 | 3.080505E−02 | 1.291241E−02 |
| A8 | −6.607013E−03 | −1.539932E−03 | −7.603191E−03 | −2.664224E−03 |
| A10 | 2.217376E−03 | 7.345109E−04 | 1.256611E−03 | 3.707843E−04 |
| A12 | −4.585966E−04 | −1.543718E−04 | −1.310198E−04 | −3.272748E−05 |
| A14 | 5.898961E−05 | 1.813695E−05 | 8.550575E−06 | 1.818438E−06 |
| A16 | −4.487229E−06 | −1.208822E−06 | −3.398522E−07 | −6.210316E−08 |
| A18 | 1.837032E−07 | 4.267634E−08 | 7.546170E−09 | 1.195999E−09 |
| A20 | −3.122527E−09 | −6.196761E−10 | −7.202173E−11 | −9.913037E−12 |

Figure 22:
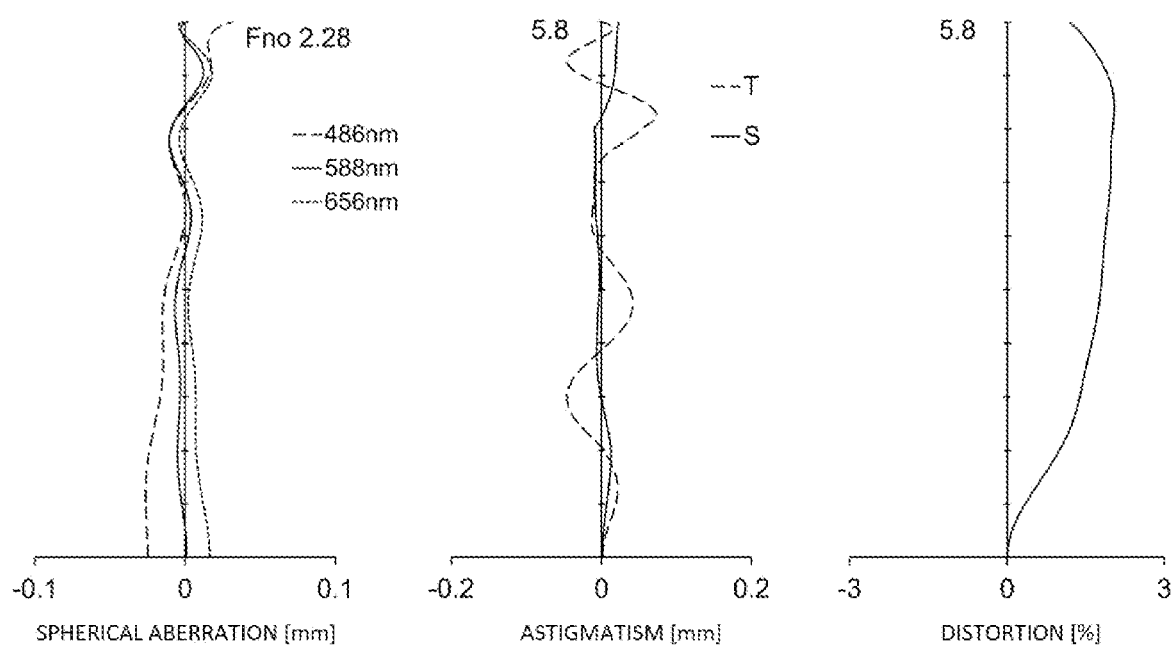
FIG. 22 is an aberration diagram illustrating spherical aberration, astigmatism, and distortion of the imaging lens in FIG. 21.
Figure 23:
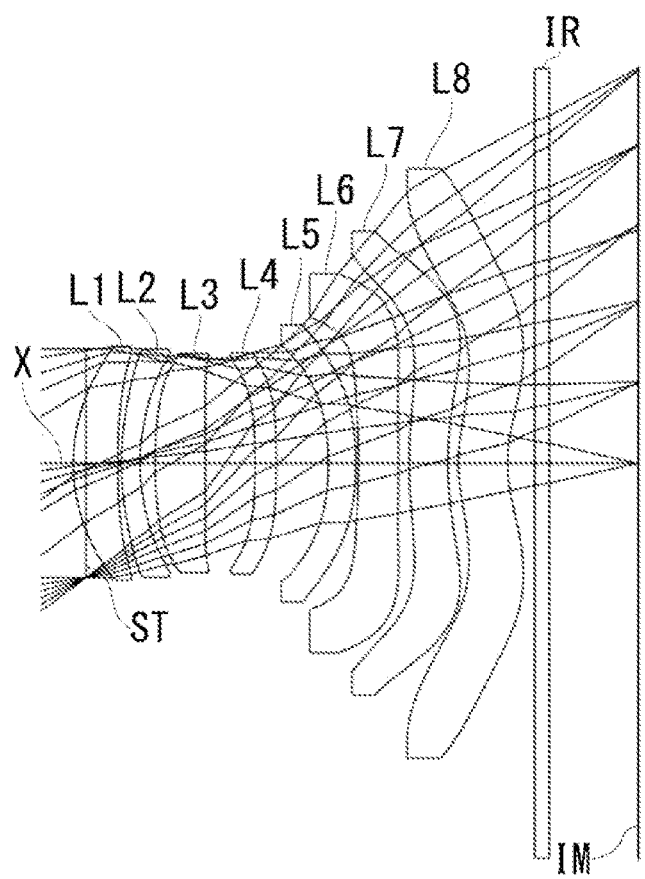
FIG. 23 is a sectional view illustrating a schematic configuration of an imaging lens according to Example 12 of the present invention.

As illustrated in FIG. 22, the imaging lens according to Example 11 is also capable of satisfactorily correcting the aberrations.

EXAMPLE 12

The basic lens data is shown below.

TABLE 23

Example 12

Unit mm f = 7.706
Fno = 2.30
ω(°) = 37.0
h = 5.8
TTL = 8.24

Surface Data

| i | r | d | nd | vd | |
|---|---|---|---|---|---|
| (Object) | Infinity | Infinity | | | |
| 1 (Stop) | Infinity | −0.184 | | | |
| 2* | 2.706 | 0.652 | 1.544 | 56.44 | (vd1) |
| 3* | 8.305 | 0.052 | | | |
| 4* | 3.844 | 0.272 | 1.671 | 19.24 | (vd2) |
| 5* | 2.834 | 0.225 | | | |
| 6* | 7.190 | 0.736 | 1.544 | 56.44 | (vd3) |

TABLE 23-continued

Example 12

| i | r | d | nd | vd | |
|---|---|---|---|---|---|
| 7* | −137.219 | 0.732 | | | |
| 8* | −11.621 | 0.313 | 1.544 | 56.44 | (vd4) |
| 9* | −14.282 | 0.772 | | | |
| 10* | −4.224 | 0.406 | 1.671 | 19.24 | (vd5) |
| 11* | −4.727 | 0.041 | | | |
| 12* | −8.272 | 0.582 | 1.544 | 56.44 | (vd6) |
| 13* | −36.474 | 0.162 | | | |
| 14* | 6.663 | 0.567 | 1.544 | 56.44 | (vd7) |
| 15* | 5.338 | 0.151 | | | |
| 16* | 2.391 | 0.723 | 1.544 | 56.44 | (vd8) |
| 17* | 2.058 | 0.400 | | | |
| 18 | Infinity | 0.210 | 1.517 | 64.20 | |
| 19 | Infinity | 1.313 | | | |
| Image Plane | | | | | |

Constituent Lens Data

| Lens | StartSurface | FocalLength | TotalTrack/DiagonalRatio |
|---|---|---|---|
| L1 | 2 | 7.081 | 0.72 |
| L2 | 4 | −18.031 | |
| L3 | 6 | 12.571 | |
| L4 | 8 | −119.494 | |
| L5 | 10 | −87.526 | |
| L6 | 12 | −19.793 | |
| L7 | 14 | −58.091 | |
| L8 | 16 | −116.198 | |

TABLE 24

Aspheric Surface Data

| | 2nd Surface | 3rd Surface | 4th Surface | 5th Surface | 6th Surface | 7th Surface |
|---|---|---|---|---|---|---|
| k | −7.841713E−01 | 0.000000E+00 | −1.136885E+00 | −3.353886E+00 | 0.000000E+00 | 0.000000E+00 |
| A4 | 2.228902E−03 | −2.244810E−02 | −4.567716E−02 | −5.609548E−03 | 2.095604E−02 | −6.371821E−03 |
| A6 | 4.731734E−03 | 4.633305E−02 | 5.231678E−02 | 1.606379E−02 | −1.661441E−02 | 2.807266E−02 |
| A8 | −1.456398E−04 | −3.553930E−02 | −4.235582E−02 | −3.356719E−02 | 3.053638E−02 | −5.737057E−02 |
| A10 | −6.523383E−03 | 8.873395E−03 | 1.404717E−02 | 5.843088E−02 | −2.190907E−02 | 7.230491E−02 |
| A12 | 8.255761E−03 | 8.245950E−03 | 6.573665E−03 | −6.361162E−02 | 3.280234E−03 | −5.135865E−02 |
| A14 | −4.948596E−03 | −8.522983E−03 | −8.382043E−03 | 4.274916E−02 | 6.574788E−03 | 1.909932E−02 |
| A16 | 1.612685E−03 | 3.501289E−03 | 3.500411E−03 | −1.698970E−02 | −4.798968E−03 | −2.158957E−03 |
| A18 | −2.744342E−04 | −7.271088E−04 | −7.027808E−04 | 3.634347E−03 | 1.313195E−03 | −6.653109E−04 |
| A20 | 1.860151E−05 | 6.194809E−05 | 5.693348E−05 | −3.202224E−04 | −1.304153E−04 | 1.650578E−04 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 0.000000E+00 | 4.358582E−01 | 6.463998E+01 |
| A4 | −4.480533E−02 | −4.409301E−02 | −7.388611E−02 | −6.990146E−02 | 2.999406E−02 | −7.509482E−04 |
| A6 | 3.517213E−03 | 1.068265E−02 | 4.288317E−02 | 4.861301E−02 | −9.617270E−04 | 1.612730E−02 |
| A8 | −1.136846E−02 | −8.538186E−03 | −1.865941E−02 | −2.648039E−02 | −1.331039E−02 | −9.974852E−03 |
| A10 | 1.438338E−02 | −6.739032E−03 | −1.117509E−03 | 4.911187E−03 | 8.005720E−03 | 2.420796E−03 |
| A12 | −9.390037E−03 | 1.904429E−02 | 6.981068E−03 | 3.378144E−03 | −2.661853E−03 | −2.289368E−04 |
| A14 | 1.207884E−03 | −1.665412E−02 | −4.008637E−03 | −2.487154E−03 | 5.701378E−04 | −1.648965E−05 |
| A16 | 2.126153E−03 | 7.493250E−03 | 1.007368E−03 | 6.954899E−04 | −8.144826E−05 | 6.102138E−06 |
| A18 | −1.166759E−03 | −1.747067E−03 | −1.030868E−04 | −9.299849E−05 | 6.829472E−06 | −5.531652E−07 |
| A20 | 1.850055E−04 | 1.677334E−04 | 1.093267E−06 | 4.920331E−06 | −2.586374E−07 | 1.760849E−08 |

| | 14th Surface | 15th Surface | 16th Surface | 17th Surface |
|---|---|---|---|---|
| k | 1.230306E+00 | 1.596085E−02 | −1.156009E+00 | −4.969747E+00 |
| A4 | −2.552896E−02 | −2.913601E−03 | −1.024328E−01 | −5.179786E−02 |
| A6 | 1.022573E−02 | −2.167818E−03 | 3.081518E−02 | 1.294750E−02 |
| A8 | −6.600783E−03 | −1.541273E−03 | −7.602775E−03 | −2.662510E−03 |
| A10 | 2.217277E−03 | 7.344659E−04 | 1.256615E−03 | 3.708592E−04 |
| A12 | −4.586461E−04 | −1.543831E−04 | −1.310195E−04 | −3.272535E−05 |
| A14 | 5.898244E−05 | 1.813675E−05 | 8.550551E−06 | 1.818334E−06 |
| A16 | −4.487977E−06 | −1.208855E−06 | −3.398556E−07 | −6.211031E−08 |
| A18 | 1.837534E−07 | 4.267235E−08 | 7.546205E−09 | 1.196046E−09 |
| A20 | −3.137912E−09 | −6.188673E−10 | −7.204816E−11 | −9.947908E−12 |

Figure 24:
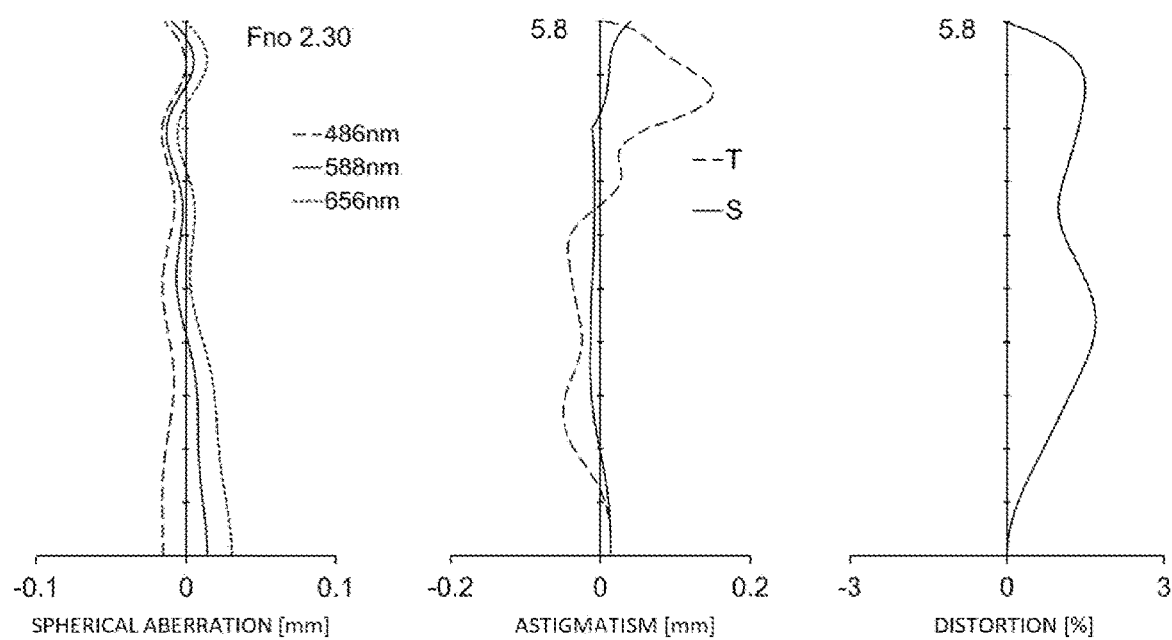
FIG. 24 is an aberration diagram illustrating spherical aberration, astigmatism, and distortion of the imaging lens in FIG. 23.

As illustrated in FIG. 24, the imaging lens according to Example 12 is also capable of satisfactorily correcting the aberrations.

As described above, the imaging lens according to the present embodiment is capable of allows satisfactorily correcting aberrations in spite of the small total track/diagonal ratio. The values corresponding to the conditional expressions (1) through (18) in Examples according to the present embodiment (corresponding values for conditional expressions) are listed below.

TABLE 25

| Corresponding Value for Conditional Expression | | Example 1 | Example 2 | Example 3 | Example 4 | Example 5 | Example 6 |
|---|---|---|---|---|---|---|---|
| (1)  | f2/f3         | −1.31  | −1.17  | −1.32  | −1.29  | −1.32  | −1.29  |
| (2)  | f3/f          | 1.622  | 1.704  | 1.648  | 1.500  | 1.656  | 1.677  |
| (3)  | f4/f3         | −3.942 | −2.254 | −3.576 | −2.398 | −4.311 | −4.212 |
| (4)  | f34/4         | 2.113  | 2.831  | 2.207  | 2.352  | 2.109  | 2.137  |
| (5)  | f6/f          | −2.690 | −3.109 | −2.495 | −4.105 | −2.494 | −2.463 |
| (6)  | f56/f         | −2.975 | −4.284 | −2.734 | −4.276 | −2.697 | −2.713 |
| (7)  | f7/f8         | 2.675  | 1.211  | 0.498  | 0.546  | 2.045  | 1.991  |
| (8)  | f78/f         | −4.625 | −3.671 | −5.975 | −3.325 | −4.560 | −3.863 |
| (9)  | f56/f78       | 0.643  | 1.167  | 0.458  | 1.286  | 0.591  | 0.702  |
| (10) | R2r/R3f       | 0.473  | 0.503  | 0.459  | 0.506  | 0.469  | 0.481  |
| (11) | R6f/f         | −0.806 | −0.878 | −0.719 | −0.682 | −0.905 | −0.885 |
| (12) | D45/D34       | 0.638  | 0.531  | 0.679  | 0.766  | 0.649  | 0.640  |
| (13) | D34/T3        | 0.920  | 0.949  | 0.942  | 0.807  | 0.928  | 0.963  |
| (14) | νd5           | 18.42  | 18.42  | 19.24  | 19.24  | 18.42  | 19.24  |
| (15) | νd6           | 55.69  | 55.69  | 37.40  | 37.40  | 55.69  | 55.69  |
| (16) | νd7           | 55.69  | 55.69  | 55.69  | 55.69  | 55.69  | 55.69  |
| (17) | νd8           | 55.69  | 55.69  | 55.69  | 55.69  | 55.69  | 55.69  |
| (18) | \|νd6 − νd7\|/νd7 | 0.00 | 0.00 | 0.33 | 0.33 | 0.00 | 0.00 |

| Corresponding Value for Conditional Expression | | Example 7 | Example 8 | Example 9 | Example 10 | Example 11 | Example 12 |
|---|---|---|---|---|---|---|---|
| (1)  | f2/f3         | −0.86   | −1.19   | −0.93  | −1.06   | −1.05   | −1.43  |
| (2)  | f3/f          | 2.495   | 1.864   | 2.498  | 2.236   | 2.302   | 1.631  |
| (3)  | f4/f3         | −11.455 | −20.060 | −8.269 | −11.457 | −10.681 | −9.506 |
| (4)  | f34/4         | 2.711   | 1.959   | 2.814  | 2.454   | 2.545   | 1.819  |
| (5)  | f6/f          | −2.572  | −3.051  | −3.040 | −3.381  | −3.451  | −2.569 |
| (6)  | f56/f         | −2.688  | −2.471  | −2.716 | −2.607  | −2.570  | −2.032 |
| (7)  | f7/f8         | 0.985   | 1.413   | 1.790  | 1.193   | 0.704   | 0.500  |
| (8)  | f78/f         | −5.556  | −5.024  | −5.833 | −5.468  | −5.428  | −4.682 |
| (9)  | f56/f78       | 0.484   | 0.492   | 0.466  | 0.477   | 0.473   | 0.434  |
| (10) | R2r/R3f       | 0.444   | 0.462   | 0.417  | 0.428   | 0.424   | 0.394  |
| (11) | R6f/f         | −1.153  | −1.255  | −1.285 | −1.554  | −2.318  | −1.073 |
| (12) | D45/D34       | 1.523   | 1.415   | 1.417  | 1.430   | 1.458   | 1.055  |
| (13) | D34/T3        | 0.910   | 0.990   | 0.981  | 0.982   | 0.985   | 0.995  |
| (14) | νd5           | 19.24   | 19.24   | 19.24  | 19.24   | 19.24   | 19.24  |
| (15) | νd6           | 55.69   | 55.69   | 55.69  | 55.69   | 37.40   | 56.44  |
| (16) | νd7           | 55.69   | 55.69   | 55.69  | 55.69   | 55.69   | 56.44  |
| (17) | νd8           | 55.69   | 55.69   | 55.69  | 55.69   | 55.69   | 56.44  |
| (18) | \|νd6 − νd7\|/νd7 | 0.00 | 0.00 | 0.00 | 0.00 | 0.33 | 0.00 |

Therefore, when the imaging lens according to the above embodiment is applied to imaging optical systems of cameras built in portable information devices, such as smartphones, cellular phones, and portable information terminals, video game consoles, home appliances, automobiles, and the like, it is possible to achieve both greater functionality and miniaturization of the cameras.

The present invention is applicable to an imaging lens assembled into relatively small-sized cameras to be built in portable information devices, such as smartphones, medical devices, video game consoles, home appliances, automobiles, and the like.

DESCRIPTION OF REFERENCE NUMERALS

X: optical axis
ST: aperture stop
L1: first lens
L2: second lens
L3: third lens
L4: fourth lens
L5: fifth lens
L6: sixth lens
L7: seventh lens
L8: eighth lens
IR: filter
IM: image plane

What is claimed is:

1. An imaging lens for forming an image of an object on an image sensor comprising: in order from an object side to an image side,
  a first lens having positive refractive power;
  a second lens having negative refractive power;
  a third lens having positive refractive power;
  a fourth lens having negative refractive power;
  a fifth lens;
  a sixth lens having negative refractive power;
  a seventh lens having negative refractive power; and
  an eighth lens having negative refractive power,
  wherein the second lens has a convex object-side surface in a paraxial region,
  the sixth lens has a concave object-side surface in a paraxial region, and wherein a conditional expression (16) below is satisfied:

$35 < \nu d7 < 85$     (16)

where vd7: an abbe number at the d-line of the seventh lens.

2. The imaging lens according to claim 1, wherein a conditional expression (1) below is satisfied:

$$-3.0 < f2/f3 < -0.2 \qquad (1)$$

where f2: a focal length of the second lens, and
f3: a focal length of the third lens.

3. The imaging lens according to claim 1, wherein a conditional expression (2) below is satisfied:

$$1.0 < f3/f < 7.0 \qquad (2)$$

where f: a focal length of entire optical system of the imaging lens, and
f3: a focal length of the third lens.

4. The imaging lens according to claim 1, wherein a conditional expression (3) below is satisfied:

$$-30.0 < f4/f3 < -1.0 \qquad (3)$$

where f3: a focal length of the third lens, and
f4: a focal length of the fourth lens.

5. The imaging lens according to claim 1, wherein a conditional expression (4) below is satisfied:

$$1.0 < f34/f < 6.0 \qquad (4)$$

where f: a focal length of entire optical system of the imaging lens, and
f34: a composite focal length of the third lens and the fourth lens.

6. The imaging lens according to claim 1, wherein a conditional expression (5) below is satisfied:

$$-8.0 < f6/f < -1.5 \qquad (5)$$

where f: a focal length of entire optical system of the imaging lens, and
f6: a focal length of the sixth lens.

* * * * *